(12) United States Patent
Maeda et al.

(10) Patent No.: US 8,888,262 B2
(45) Date of Patent: Nov. 18, 2014

(54) ACTINIC ENERGY RADIATION CURABLE INKJET INK AND INKJET RECORDING METHOD

(75) Inventors: Akio Maeda, Hachioji (JP); Hirotaka Iijima, Hachioji (JP)

(73) Assignee: Konica Minolta Holdings, Inc. (JP)

( * ) Notice: Subject to any disclaimer, the term of this patent is extended or adjusted under 35 U.S.C. 154(b) by 799 days.

(21) Appl. No.: 13/127,150

(22) PCT Filed: Oct. 17, 2009

(86) PCT No.: PCT/JP2009/067944
§ 371 (c)(1),
(2), (4) Date: May 2, 2011

(87) PCT Pub. No.: WO2010/053004
PCT Pub. Date: May 14, 2010

(65) Prior Publication Data
US 2011/0216124 A1 Sep. 8, 2011

(30) Foreign Application Priority Data

Nov. 7, 2008 (JP) .................................. 2008-286248
Nov. 18, 2008 (JP) .................................. 2008-294202

(51) Int. Cl.
*C09D 11/00* (2014.01)
*C09D 11/101* (2014.01)
*C09D 11/322* (2014.01)

(52) U.S. Cl.
CPC ............ *C09D 11/322* (2013.01); *C09D 11/101* (2013.01)
USPC ....................................................... 347/100

(58) Field of Classification Search
USPC ....................................................... 347/100
See application file for complete search history.

(56) References Cited

U.S. PATENT DOCUMENTS 3,969,087 A * 7/1976 Saito et al. ................... 44/270

FOREIGN PATENT DOCUMENTS

| JP | 51-19139 B | 2/1976 | |
| JP | 51-125677 A | 11/1976 | |
| JP | 4-257485 A | 9/1992 | |
| JP | 11-315245 A | 11/1999 | |
| JP | 2002-241654 A | 8/2002 | |
| JP | 2004-516963 A | 6/2004 | |
| JP | 2005-126507 A | 5/2005 | |
| JP | 2005-126508 A | 5/2005 | |
| JP | 2005255821 A * | 9/2005 | ............ C09D 11/00 |
| WO | 02/053659 A2 | 7/2002 | |
| WO | 2007/025863 A1 | 3/2007 | |

OTHER PUBLICATIONS

International Search Report for International Application No. PCT/JP2009/067944 with English translation mailed Jan. 19, 2010.

* cited by examiner

*Primary Examiner* — Laura Martin
(74) *Attorney, Agent, or Firm* — Cantor Colburn LLP

(57) ABSTRACT

Disclosed is an actinic energy radiation curable inkjet ink which can be printed on various types of recording media, has excellent printed image quality and excellent fixability particularly on coated printing paper, and is improved in storage stability and ejection stability. Also disclosed is an inkjet recording method using the actinic energy radiation curable inkjet ink. The actinic energy radiation curable inkjet ink is characterized by containing a compound represented by Formula (1) or a compound represented by Formula (2) in an amount of not less than 0.1% by mass and less than 20% by mass based on a total mass of the ink.

9 Claims, 2 Drawing Sheets

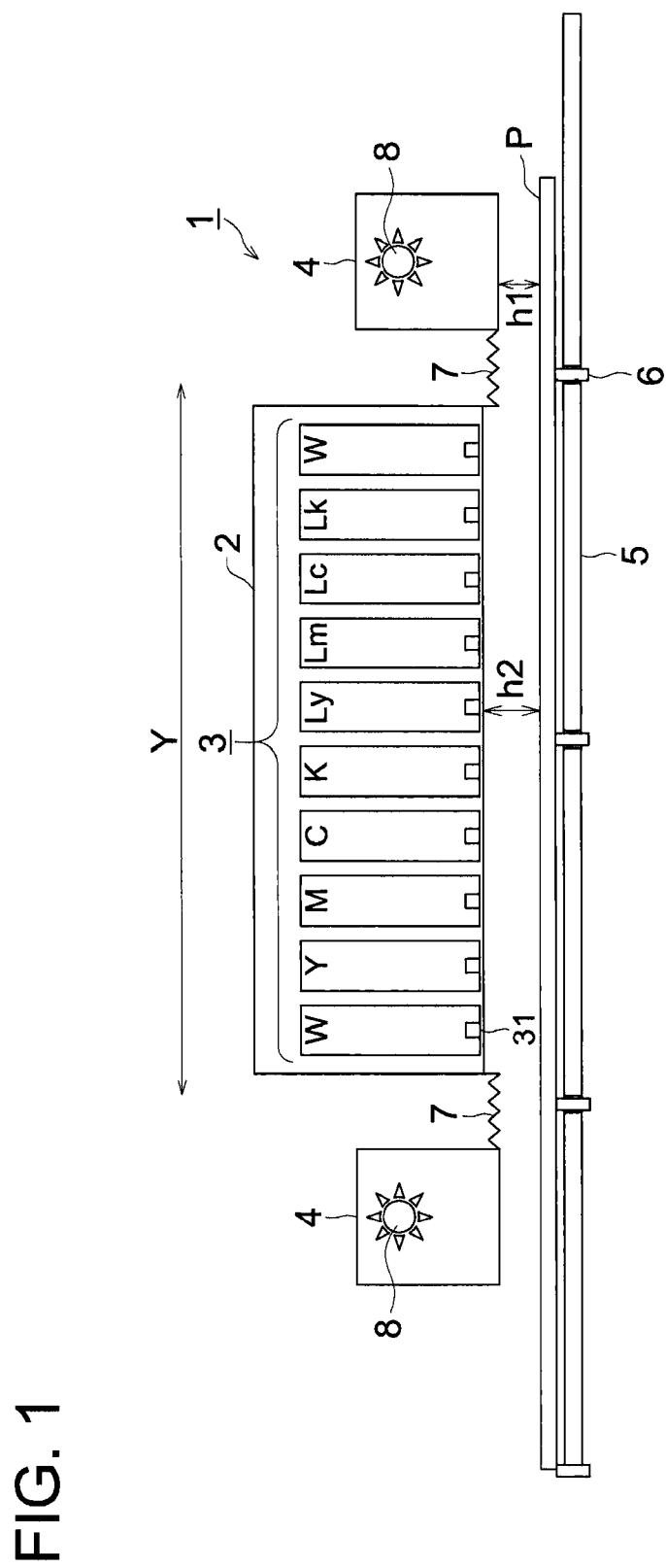

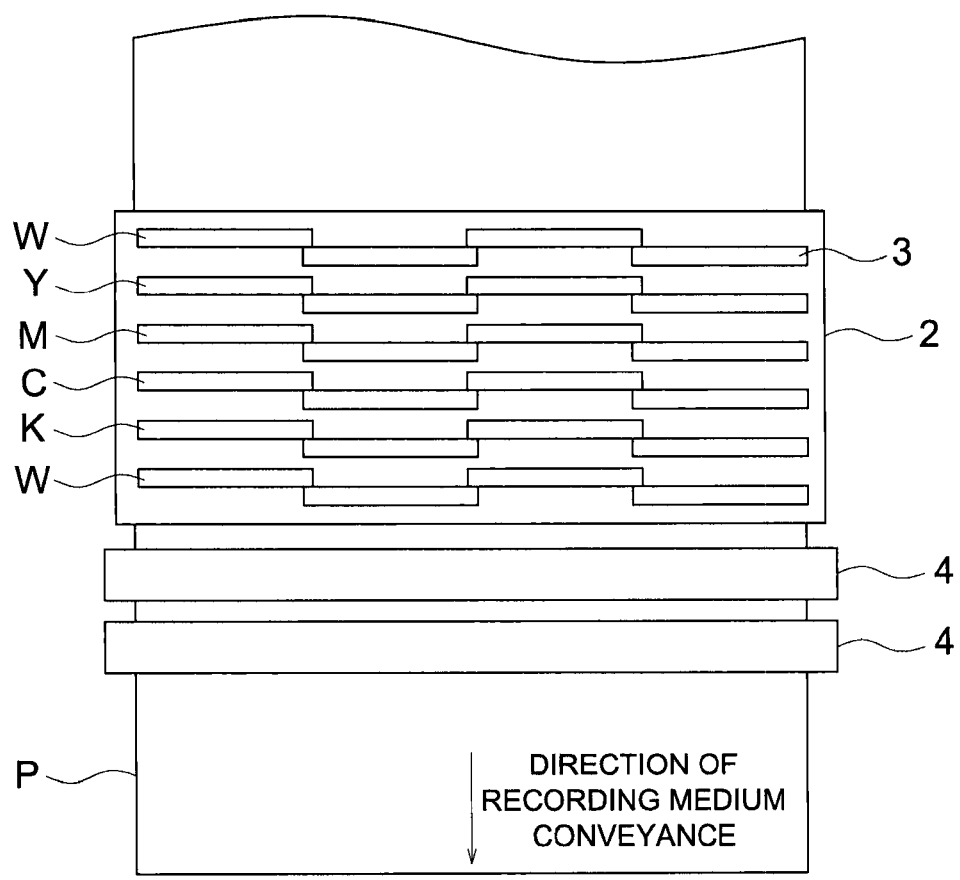

ACTINIC ENERGY RADIATION CURABLE INKJET INK AND INKJET RECORDING METHOD

CROSS REFERENCE TO RELATED APPLICATIONS

This is a U.S. national stage application of International Application No. PCT/JP2009/067944, filed on 17 Oct. 2009. Priority under 35 U.S.C. 119(a) and 35 U.S.C. 365(b) is claimed from Japanese Application No. JP 2008-286248, filed 7 Nov. 2008, and JP 2008-294202, filed 18 Nov. 2008, the disclosure of which is also incorporated herein by reference.

FIELD OF TECHNOLOGY

The present invention relates to an actinic energy radiation curable inkjet ink comprising a compound which changes a sol-gel phase transition reversibly according to a temperature and an inkjet recording method using thereof.

TECHNICAL BACKGROUND

In recent years, since inkjet recording enables to form an image simply and less expensively, it has been applied to various printing fields such as photography, various types of printing, marking, and special printing such as color filters. Specifically, by employing inkjet recording apparatuses which eject and control minute ink droplets, inkjet inks whose range of color reproduction, durability, and ejection adaptability have been enhanced, and paper for inkjet printing use whose ink-absorbability, color forming properties of colorants and surface glossiness have also been markedly enhanced, it has become possible to provide an image of high quality comparable to conventional silver halide photography.

However, the inkjet image recording system which requires special paper for inkjet printing use causes problems such as restriction of recording media usable in the system, and a subsequent cost increase of the recording media.

On the other hand, in an office and in a light printing, it is growing increasingly the need of a system which enables to carry out a full color printing at high speed without receiving restriction of recording media (for example, a plain paper, a coated paper, and an art paper, a double-sided printing on a plain paper etc.). In an electrophotographic method, there exists high speed type which can prints more than hundred papers in A4 size per minute. However, so as to satisfy requirement such as an easy-to-use, cost, consumed power, and printing high quality on various recording medium, there still remain many technical problems and requests by users are not satisfied enough.

In an inkjet recording method, when image recording is performed by using aqueous ink on a recording medium having high ink absorption such as plain papers, there is a problem that feathering in which ink bleeds and spread into a recording medium, or and a rear side penetration in which ink penetrates to a rear side of the recording medium. When image recording is performed on a recording medium without having an ink absorption layer such as coated papers, there is a problem that droplets coalescence with each others causes liquid gathering, resulting in an image mottling, or insufficient drying and fixing of ink.

Recently, for a purpose of high speed recording, developed is an inkjet printing in which an image is formed by a single pass system by using line scan type inkjet head. When printing is carried out by applying an aqueous ink to this line printing method (single pass method), liquid gathering or insufficient fixing on a coated paper tends to be worse than those by a multi-pass printing method. Further, as the single pass method requires faster drying, the single pass method requires large energy for drying and results in problem of high power consumption.

As one of the methods to resolve above problems, proposed is a method for forming an image recording by inkjet recording method onto various recording medium other than exclusive paper. Specific example include an ultraviolet ray curable inkjet recording method in which a photo curable compound such as an ultraviolet curable composition is cross-linked and cured by irradiating an actinic radiation such as ultraviolet (UV) ray after printing, or a phase change type inkjet recording method using wax ink being solid at room temperature.

Specifically, disclosed is a technology in which an inkjet ink comprising organic solvent, colorant and ultraviolet curable composition are printed onto polyethylene terephtalate film or vinylchloride sheet, and cured by irradiating of ultraviolet ray via ultraviolet ray irradiation apparatus, resulting in enhancing an ink fixation property by finger-touch dryness evaluation and solvent resistance by methanol-rubbing evaluation (For example, referred to Patent Document 1).

Constitution above enables to print with good fixing property on various recording medium. However, in the ultraviolet ray curing method, time lags occur between an ink deposition on the recording medium and an ultraviolet ray irradiation. During the time lags, ink wets and spreads and results in problem such that recorded dot size depends on a length of time lags, specifically on a constitution of apparatus or a recording speed. Further, when these constitutions are applied to a nonabsorbable recording medium such as a coated printing paper, because wet and spread state of ink changes according to a species of the recording medium, the recorded dot size changes according to the species of the recording medium, resulting in problem in which obtained image quality depends on the species of the recording medium.

Further, when an actinic energy radiation curing system is applied to a single pass method, problem occurs in which image quality tends to deteriorated by liquid gathering because deposited droplets tend to coalesce with each others before being irradiated by actinic energy radiation.

On the other hand, known is a method in which a solid ink at room temperature comprising wax having low melting temperature is heated (for example, to 120° C. or more), melted, ejected in melted state and solidified immediately after depositing on a recording medium. By applying this method, moderate image quality can be obtained even on a recording medium having ink absorption such as plain paper. However, in order to enhance friction resistance of the obtained image, it is necessary to enhance a hardness of an ink after solidification, and consequently wax having high melting temperature is needed so as to have a desired hardness. For example, in case of using wax having melting temperature of 120° C. or more, heating ink at high temperature as 120° C. or more becomes load on heat resistance of recording head and constituted materials of ink supply system in an inkjet printing apparatus, resulting in difficulty in keeping durability of the printing apparatus and having to use a large size apparatus. Specifically, in a method of using piezo element as a recording head, because it has Curie temperature as the upper temperature limit, there is natural limit to the upper limit for heating.

Further, disclosed is a method in which ink comprises alkyl aryl cycloalkanol as a gelling agent and the gelling agent ink functions to improve bleeding between color dots (for example, referred to Patent Document 2). However, by the method proposed in Patent Document 2, ink solidification function is not sufficient because only gelling agent is used to function as ink solidification. Specifically, in case of conveying plain papers at high speed in high speed printing, there occurs a problem that ink image is peeled off from the recording medium. Further, Patent Document 1 does not disclose relating to using an actinic radiation curable composition in combination with gelling agent in an ink at all.

Further, disclosed is a technology in which a bleed-through resistance and print quality is improved in case of printing on plain paper by adding oil gelling agent to an ultraviolet ray curable inkjet ink which has a function to turn into gel an organic solvent (for example, referred to Patent Document 3). However, there are some problems such that thixotropy appears in some kind of gelling agents or in case of storing in low temperature as 0° C., precipitation of compound occurs which is estimated as gelling agent Patent Document 1: Unexamined Japanese Patent Application Publication (hereinafter referred to as JP-A) No. 2002-241654

Patent Document 2: JP-A No. 11-315245

Patent Document 3: JP-A No. 2005-126507

SUMMARY OF THE INVENTION

Problems to be Solved by the Present Invention

In view of the foregoing, the present invention was achieved. An object of the present invention is to provide an actinic energy radiation curable inkjet ink and an inkjet recording method using the same which can be printed on various types of recording media, has excellent printed image quality and excellent fixability particularly on coated printing paper, and is improved in storage stability and ejection stability.

Means to Solve the Problems

The above object has been achieved by the following constitutions.

1. An actinic energy radiation curable inkjet ink comprising a compound represented by Formula (1) or a compound represented by Formula (2) in an amount of not less than 0.1% by mass and less than 20% by mass based on a total mass of the ink, Formula (1):

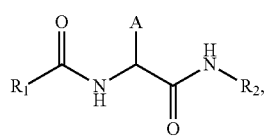

wherein $R_1$ and $R_2$ each represents a linear, a branched or a cyclic alkyl group, or a linear, a branched or a cyclic alkenyl group; A represents a linear or a branched alkyl group having a carbon number of 1 to 4, or a benzyl group, Formula (2):

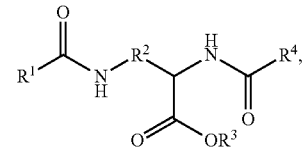

wherein $R^1$ and $R^4$ each represents a linear or a branched alkyl group, or a linear or a branched alkenyl group; $R^2$ represents a linear alkylene group having a carbon number of 1 to 5; $R^3$ represents a linear alkyl group having a carbon number of 1 to 5.

2. The actinic energy radiation curable inkjet ink of item 1, wherein A in Formula (1) is at least one group selected from methyl group, isopropyl group, isobutyl group, sec-butyl group and benzyl group.

3. The actinic energy radiation curable inkjet ink of item 1 or 2, wherein an end of $R^1$ and $R^4$ each in Formula (1) is a vinyl group or a methyl group, and other than end thereof is a linear saturated alkyl group having carbon numbers of 2 to 30.

4. The actinic energy radiation curable inkjet ink of item 1, wherein $R^2$ in Formula (2) is a tetramethylene group, and $R^1$ and $R^4$ each is a linear alkyl group having carbon numbers of 2 to 30, and the end thereof is a vinyl group or a hydrogen atom.

5. The actinic energy radiation curable inkjet ink of any one of items 1 to 4, comprising a pigment as a colorant.

6. The actinic energy radiation curable inkjet ink of any one of items 1 to 5, wherein the ink changes a sol-gel phase transition reversibly according to a temperature, and the sol-gel phase transition temperature is not less than 30° C. and less than 100° C.

7. An inkjet recording method for recording an image comprising jetting the actinic energy radiation curable inkjet ink of any one of items 1 to 6 on a recording medium, wherein the image is recorded under a condition of a difference of a temperature between the temperature of the actinic energy radiation curable inkjet ink in the recording head and the temperature of the recording medium being not less than 25° C. and less than 100° C.

8. The inkjet recording method of item 7, wherein the actinic energy radiation curable inkjet ink is heated in the recording head.

9. The inkjet recording method of item 7 or 8, wherein the image is recorded under heating the recording head in a range from not less than T+10° C. to less than T+40° C., wherein T(° C.) is the sol-gel phase transition temperature.

Effects of the Invention

According to the present invention, an actinic energy radiation curable inkjet ink and an inkjet recording method using the same can be provided which can be printed on various types of recording media, has excellent printed image quality and excellent fixability particularly on coated printing paper, and is improved in storage stability and ejection stability.

BRIEF DESCRIPTION OF THE DRAWING

FIG. 1 is a schematic cross-sectional view showing the constitution of a main section of a serial recording type inkjet recording apparatus.

FIG. 2 is a top view showing an example of the constitution of a main section of a line head type inkjet recording apparatus.

DESCRIPTION OF THE PREFERRED EMBODIMENT

In view of the foregoing, the inventors of the present invention conducted diligent investigations. As a result, the following was discovered, and the present invention was achieved. By using an actinic energy radiation curable inkjet ink comprising a compound represented by Formula (1) or a compound represented by Formula (2) in an amount of not less than 0.1% by mass and less than 20% by mass based on a total mass of the ink, an actinic energy radiation curable inkjet ink can be realized which can be printed on various types of recording media, has excellent printed image quality and excellent fixability particularly on coated printing paper, and is improved in storage stability and ejection stability.

The actinic energy radiation curable inkjet ink comprising the compound represented by Formula (1) or the compound represented by Formula (2) in the amount of predetermined range (hereafter, referred to simply as "ink of the present invention") has low viscosity and good fluidity by heating a recording head while ink ejection. After depositing on a recording medium, mainly due to decrease of ink temperature, rapid increase of ink viscosity or phase transition from sol to gel occurs and it decreases ink fluidity remarkably, thereby inhibits spread of recorded dot by wetting and spreading on a coated printing paper and further inhibits coalescence between ink droplets. Consequently, print image quality on the coated printing paper can be tremendously improved.

The present invention will now be detailed.

The actinic energy radiation curable inkjet ink according to the present invention is characterized by that comprise a compound represented by Formula (1) or a compound represented by Formula (2).

Increase of ink viscosity or gelling according to a decrease of temperature can be provided by adding the compound represented by Formula (1) or the compound represented by Formula (2) related to the present invention to the ink.

Whether ink viscosity being increased or turning into a gel can be controlled by a content of the compound represented by Formula (1) or the compound represented by Formula (2). In order to obtain maximum performance on print image quality or bleed-through resistance on the recording medium, ink is preferably gelled on the recording medium. Gel according to the present invention refers to a collective structure of solute by loosing independent mobility as a result of an interaction such as a lamella structure, a polymer network with a covalent bond or a hydrogen bond, a polymer network formed by a physical coagulation, and a coagulation structure of fine particles, and a state of solidification or half-solidification accompanied by a rapid viscosity increasing or a remarkable elasticity increasing.

In the case when the actinic energy radiation curable inkjet ink according to the present ink changes a sol-gel phase transition reversibly according to a temperature, and the sol-gel phase transition temperature is arbitrarily set, preferably not less than 30° C. and less than 100° C. In the case of phase transition temperature less than 30° C., it is difficult to keep stable ejection due to an influence by an ambient temperature while ejecting ink droplets from recording head. In the case of phase transition temperature more than 100° C., an inkjet recording apparatus has to be heated at high temperature, and it becomes load on heat resistance of recording head and constituted materials of ink supply system in an inkjet printing apparatus, resulting in difficulty in keeping durability of the printing apparatus and having to use a large size apparatus and high cost accompanying thereby.

The phase transition temperature by sol-gel relating to the invention means the temperature at which a viscosity changes rapidly from a fluid solution state to a gel state and synonymous with a gel transfer temperature, a gel soluble temperature, a gel softening temperature, a sol-gel transfer temperature and a gel point.

The measurement of a phase transition temperature of ink relating to the invention includes, for example, a method which defines as follows. A gel-like test piece is located on a heat plate, and a temperature when a shape of test-piece is destroyed by heating on a heat plate is observed and defined as a sol-gel transition temperature. Sol-gel phase transition temperature is preferably between the temperature of the ink in the head and that of the recording medium. Sol-gel phase transition temperature relating to the invention can be controlled by a content of the compound represented by Formula (1) or the compound represented by Formula (2).

At first, the compounds represented by Formula (1) according to the present invention will be detailed.

In Formula (1), $R_1$ and $R_2$ each represents a linear, a branched or a cyclic alkyl group such as methyl group, ethyl group, propyl group, isopropyl group, tert-butyl group, pentyl group, hexyl group, octyl group, dodecyl group, tridecyl group, tetradecyl group, pentadecyl group, hexadecyl group, heptadecyl group, octadecyl group, nonadecyl group, eicosyl group, heneicosyl group, docosyl group, tricosyl group, tetracosyl group, pentacosyl group, hexacosyl group, heptacosyl group, octacosyl group, or nonacosyl group; or a linear, a branched or a cyclic alkenyl group such as vinyl group or allyl group; A represents a linear or a branched alkyl group having a carbon number of 1 to 4 such as methyl group, ethyl group, propyl group, isopropyl group, iso-butyl group, sec-butyl group, or tert-butyl group, or a benzyl group.

Further, in Formula (1), A is preferable at least one group selected from methyl group, isopropyl group, isobutyl group, sec-butyl group, and benzyl group.

Further, in Formula (1), a terminal of $R_1$ and $R_2$ each is preferable vinyl group or methyl group, and other than the terminal is a linear saturated alkyl group having carbon number of 2 to 30 such as ethyl group, propyl group, isopropyl group, tert-butyl group, pentyl group, hexyl group, octyl group, dodecyl group, tridecyl group, tetradecyl group, pentadecyl group, hexadecyl group, heptadecyl group, octadecyl group, nonadecyl group, eicosyl group, heneicosyl group, docosyl group, tricosyl group.

The compounds represented by Formula (1) will now be exemplified, however the present invention is not limited thereto.

1

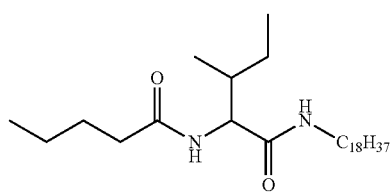

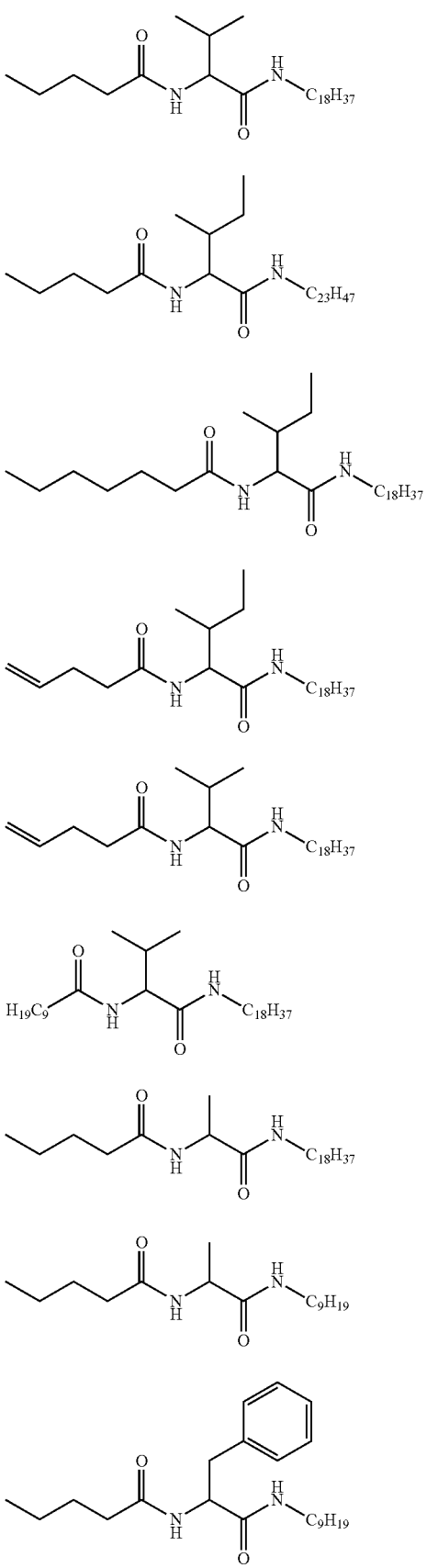
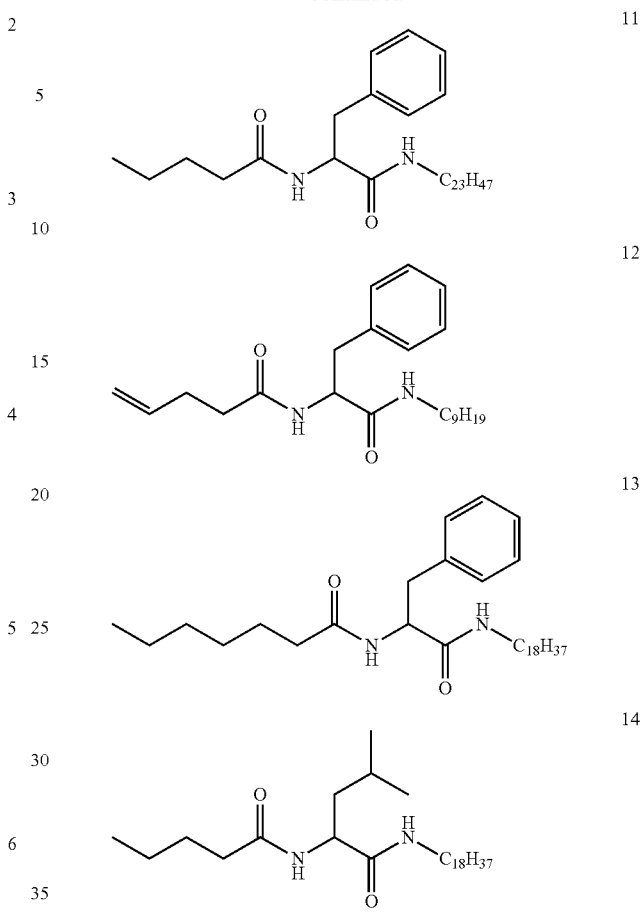

Next, the compounds represented by Formula (2) will be detailed.

In Formula (2), $R^1$ and $R^4$ each represents a linear or a branched alkyl group such as methyl group, ethyl group, propyl group, isopropyl group, tert-butyl group, pentyl group, hexyl group, octyl group, dodecyl group, tridecyl group, tetradecyl group, pentadecyl group, hexadecyl group, heptadecyl group, octadecyl group, nonadecyl group, eicosyl group, heneicosyl group, docosyl group, tricosyl group, tetracosyl group, pentacosyl group, hexacosyl group, heptacosyl group, octacosyl group, or nonacosyl group; or a linear or a branched alkenyl group such as vinyl group or allyl group; $R^2$ represents a linear alkylene group having a carbon number of 1 to 5 such as methylene group, ethylene group, trimethylene group, tetramethylene group, propylene group, ethylethylene group, or pentamethylene group; $R^3$ represents a linear alkyl group having a carbon number of 1 to 5 such as methyl group, ethyl group, propyl group, iso-propyl group, iso-butyl group, sec-butyl group, tert-butyl group, or pentyl group.

In Formula (2), $R^2$ is preferable a tetramethylene group, and $R^1$ and $R^4$ each is preferable a linear alkylene group having a carbon number of 1 to 5 and a terminal thereof is vinyl group or hydrogen atom.

The compounds represented by Formula (2) will now be exemplified, however the present invention is not limited thereto.

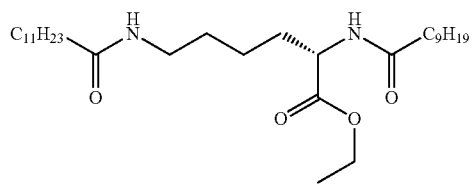

I

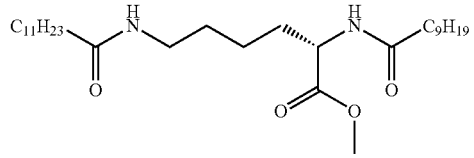

II

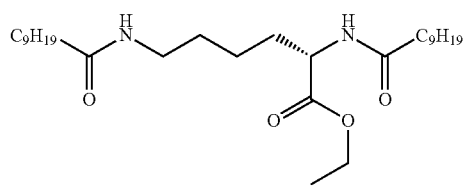

III

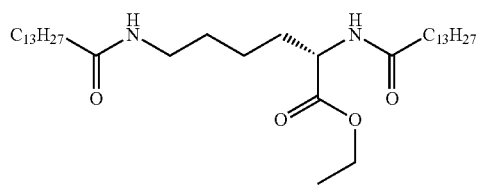

IV

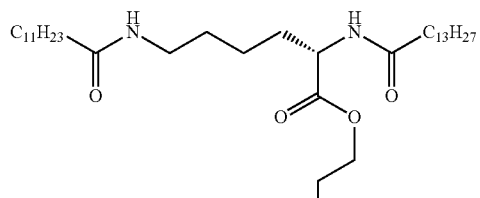

V

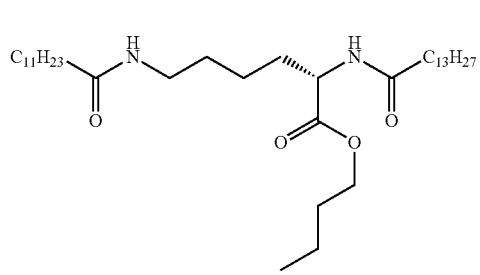

VI

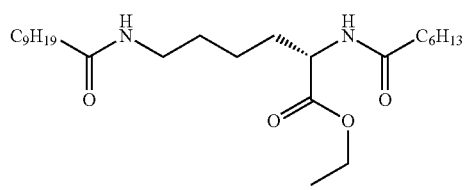

VII

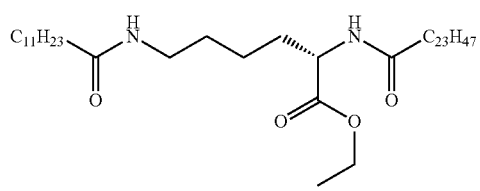

VIII

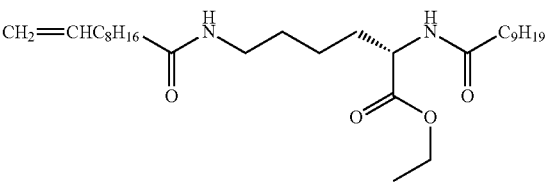

IX

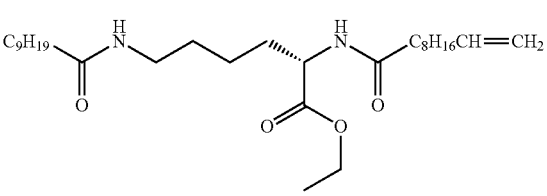

X

A content of a compound represented by Formula (1) or a compound represented by Formula (2) in an ink is characterized by an amount of not less than 0.1% by mass and less than 20% by mass based on a total mass of the ink. According to the present invention, the content of a compound represented by Formula (1) or a compound represented by Formula (2) in an ink is not less than 0.1% by mass based on a total mass of the ink enables to have results satisfied with sufficient print quality and bleed-through resistance on the recording medium, due to enough viscosity increase or gelling after depositing on the recording medium. Further, the content of a compound represented by Formula (1) or a compound represented by Formula (2) in an ink is less than 20% by mass based on a total mass of the ink enables stable ejection and stable dispersion of pigment when used colorant is pigment.

Above remarkable effect is shown when the content of a compound represented by Formula (1) or a compound represented by Formula (2) in an ink is not less than 0.1% by mass and less than 20% by mass based on a total mass of the ink. The content is more preferable not less than 0.5% by mass and less than 20% by mass, specifically preferable not less than 1.0% by mass and less than 15% by mass.

The compound represented by Formula (1) or the compound represented by Formula (2) according to the present invention may be employed individually or in combinations of at least two types. In case of use in combinations of at least two types, a total amount thereof is preferable less than 20% by mass based on a total mass of the ink.

Each component other than above in the ink according to the present invention will now be detailed.

As a colorant in the ink of the present invention, dye or pigment is used without any limitation. Pigment having good dispersion stability to ink components and excellent fastness is preferred. As pigments, organic or inorganic pigments described in color index below are usable without specifically limitation.

Examples of pigments formed or magenta include C.I. Pigment Red 3, 5, 19, 22, 31, 38, 43, 48:1, 48:2, 48:3, 48:4, 48:5, 49:1, 53:1, 57:1, 57:2, 58:4, 63:1, 81, 81:1, 81:2, 81:3, 81:4, 88, 104, 108, 112, 122, 123, 144, 146, 149, 166, 168, 169, 170, 177, 178, 179, 184, 185, 208, 216, 226, 257, C.I. Pigment Violet 3, 19, 23, 29, 30, 37, 50, 88, C.I. Pigment Orange 13, 16, 20, 36.

Examples of pigments for blue or cyan include C.I. Pigment Blue 1, 15, 15:1, 15:2, 5:3, 15:4, 15:6, 16, 17-1, 22, 28, 29, 36, and 60.

Examples of pigments for green include C.I. Pigment Green 7, 26, 36, and 50.

Examples of pigments for yellow include C.I. Pigment Yellow 1, 3, 12, 13, 14, 17, 34, 35, 37, 55, 74, 81, 83, 93, 95, 97, 108, 109, 110, 137, 138, 139, 153, 154, 155, 157, 166, 167, 168, 180, 185, and 193.

Examples of pigments for black include C.I. Pigment Black 7, 28, and 26. These are applicable as appropriate.

Specific product name include: Chromo Fine Yellow 2080, 5900, 5930; AF-1300, 2700L; Chromo Fine Orange 3700L, 6730; Chromo Fine Scarlet 6750; Chromo Fine Magenta 6880, 6886, 6891N, 6790, 6887; Chromo Fine Violet RE; Chromo Fine Red 6820, 6830; Chromo Fine Blue HS-3, 5187, 5108, 5197, 5085N, SR-5020, 5026, 5050, 4920, 4927, 4937, 4824, 4933GN-EP, 4940, 4973, 5205, 5208, 5214, 5221, 5000P; Chromo Fine Green 2GN, 2GO, 2G-550D, 5310, 5370, 6930; Chromo Fine Black A-1103; Seika Fast Yellow 10GH, A-3, 2035, 2054, 2200, 2270, 2300, 2400(B), 2500, 2600, ZAY-260, 2700(B), 2770; Seika Fast Red 8040, C405(F), CA120, LR-116, 1531B, 8060R, 1547, ZAW-262, 1537B, GY, 4R-4016, 3820, 3891, ZA-215, Seika Fast Carmine 6B1476T-7, 1483LT, 3840, 3870; Seika Fast Bordeaux 10B-430; Seika Light Rose R40, Seika Light Violet B800, 7805; Seika Fast Maroon 460N; Seika Fast Orange 900, 2900; Seika Light Blue C718, A612; Cyanine Blue 4933M, 4933GN-EP, 4940, 4973 (above compounds are produced by Dainichiseika Colour & Chemicals Mfg. CO., Ltd.); KET Yellow 401, 402, 403, 404, 405, 406, 416, 424; KET Orange 501; KET Red 301, 302, 303, 304, 305, 306, 307, 308, 309, 310, 336, 337, 338, 346; KET Blue 101, 102, 103, 104, 105, 106, 111, 118, 124; KET Green 201 (above compounds are produced by Dainippon Ink and Chemicals, Inc.); Colortex Yellow 301, 314, 315, 316, P-624, 314, U10GN, U3GN, UNN, UA-414, U263; Finecol Yellow T-13, T-05; Pigment Yellow 1705; Colortex Orange 202, Colortex Red 101, 103, 115, 116, D3B, P-625, 102, H-1024, 105C, UFN, UCN, UBN, U3BN, URN, UGN, UG276, U456, U457, 105C, USN; Colortex Maroon 601; Colortex Brown 610N; Colortex Violet 600; Pigment Red 122; Colortex Blue 516, 517, 518, 519, A818, P-908, 510; Colortex Green 402, 403; Colortex Black 702, U905 (above compounds are produced by Sanyo Color Works, Ltd.); Lionol Yellow 1405G, Lionol Blue FG7330, FG7350, FG7400G, FG7405G, ES, ESP-S (above compounds are produced by TOYO INK MFG. CO., LTD); Toner Magenta E02, Permanent Rubin F6B, Toner Yellow HG, Permanent Yellopw GG-02, Hostapeam Blue B2G (Above compounds are produced by Hoechst Industry); Novoperm P-HG, Hostperm Pink E, Hostperm Blue B2G (above compounds are produced by Clariant); Carbon black #2600, #2400, #2350, #2200, #1000, #990, #980, #970, #960, #950, #850, MCF88, #750, #650, MA600, MA7, MA8, MA11, MA100, MA100R, MA77, #52, #50, #47, #45, #45L, #40, #33, #32, #30, #25, #20, #10, #5, #44, CF9 (above compounds are produced by Mitsubishi Chemical Corporation).

Dispersion liquid in which pigment is preliminary dispersed in high concentration in water, solvent and polymerizable monomer can be also available.

Pigment dispersing agent is preferably employed for dispersing pigment. As dispersing agents, listed may be active agents such as fatty acid salt, alkylsulfate, alkylester sulfate, alkyl sulfonic acid salt, sulfosuccinate, naphthalene sulfonic acid salt, alkyl phosphate, polyoxyethylene alkylene alkyleter phosphate, polyoxyethylene alkyl phenyl ether, polyoxyethylene polyoxypropylene glycol, glycerine ester, sorbitane ester, polyoxyethylene fatty acid amide and amine oxide; or block co-polymer, random co-polymer and salt thereof selected from 2 or more monomers from styrene, styrene derivatives, vinylnaphthalene derivatives, acrylic acid, acrylic acid derivatives, maleic acid derivatives, itaconic acid, itaconic acid derivatives, fumaric acid, and fumaric acid derivatives.

Pigments described above can be dispersed using, for example, a ball mill, sand mill, atreiter, roll mill, agitator, Henschel mixer, colloid mill, ultrasonic homogenizer, pearl mill, wet jet mixer or paint shaker. There may be added dispersing agents when dispersing a pigment.

A pigment dispersing agent is incorporated preferably in an amount of from 10 to 100% by mass, based on mass of the pigment.

Pigment particles preferably have an average particle size of 50 nm or more and 150 nm or less. Stability of dispersion can be increased by controlling the average particle size of pigment particles within the range defined above. As the result, clogging at head nozzles can be inhibited and jetting stability also improved. Further as ink transparency increases, curing sensitivity by actinic radiation can be increased in case of containing an actinic radiation curable compound described later.

Further with respect to the ink of the present invention, known dye, preferably an oil soluble dye may be used, as appropriate. Specific examples of oil soluble dyes are described below; however the present invention is not limited thereto.

<Magenta Dye>

Specific examples of magenta dye include MS Magenta VP, MS magenta HM-1450, MS Magenta HSo-147 (products of Mitsui-Toatsu Chemicals), AIZEN SOT Red-1, AIZEN SOT Red-2, AIZEN SOT Red-3, AIZEN SOT Pink-1, SPIRON Red GEH SPECIAL (products of Hodogaya Chemical), RESOLIN Red FB 200%, MACROLEX Red Violet R, MACROLEX ROT5B (products of Bayer Japan), KAYASET Red B, KAYASET Red 130, KAYASET Red 802 (products of Nippon Kayaku), PHLOXIN, ROSE BENGAL, ACID Red (products of Daiwa Kasei), HSR-31, DIARESIN Red K (products of Mitsui-Kasei), and Oil Red (product of BASF Japan).

<Cyan Dye>

Specific examples of Cyan dye include MS Cyan HM-1238, MS Cyan HSo-16, HS Cyan HSo-144, MS Cyan VPG (products of Mitsui-Toatsu Chemical), AIZEN SOT Blue-4 (product of Hodogaya Chemical), RESOLIN BR. Blue BGLN 200%, MACROLEX Blue RR, CERES Blue GN, SIRIUS SUPRA TURQ. Blue Z-BGL, SIRIUS SUPRA TURQ. Blue FB-LL 330% (products of Bayer Japan), KAYASET Blue FR, KAYASET Blue N, KAYASET Blue 814, Turq. Blue GL-5 200, Light Blue BGL-5 200 (products of Nippon Kayaku), DAIWA Blue 7000, Olosol Fast Blue GL (products of Daiwa Kasei), DIARESIN Blue P (product of Mitsui-Kasei), SUDAN Blue 670, NEOPEN Blue 808, and ZAPON Blue 806 (products of BASF Japan).

<Yellow Dye>

Specific examples of yellow dye include MS Yellow HSm-41, Yellow KX-7, Yellow EX-27 (products of Mitsui-Toatsu Chemical), AIZEN SOT Yellow-1, AIZEN SOT Yellow-3, AIZEN SOT Yellow-6 (products of Hodogaya Chemical), MACROLEX Yellow 6G, MACROLEX FLUOR. Yellow 10GN (products of Bayer Japan), KAYASET Yellow SF-G, KAYASET Yellow 2G, KAYASET Yellow A-G, KAYASET Yellow E-G (products of Nippon Kayaku), DAIWA Yellow 330HB (product of Daiwa Kasei), HSY-68 (product of Mitsui-Kasei), SUDAN Yellow 146, and NEOPEN Yellow 075 (products of BASF Japan).

<Black Dye>

Specific examples of Black dye include MS Black VPC (product of Mitsui-Toatsu Chemical), AIZEN SOT Black-1, AIZEN SOT Black-5 (product of Hodogaya Chemical), RESORIN Black GSN 200%, RESORIN Black BS (products of Bayer Japan), KAYASET A-N (products of Nippon Kayaku), DAIWA Black MSC (product of Daiwa Kasei), HSB-202 (product of Mitsui-Kasei), NEPTUNE Black X60, and NEOPEN Black X58 (products of BASF Japan).

Additive amount of pigment or oil soluble dye is preferably in the range of 0.1-20% by mass, more preferably in the range of 0.4-10% by mass. Excellent image quality can be obtained by 0.1% by mass or more and ink can keep proper viscosity for ejecting by 20% by mass or less. Further, mixture of 2 or more colorants may be usable for adjusting color.

The actinic energy radiation curable inkjet ink according to the present invention comprises an actinic energy radiation curable composition as well as a compound represented by Formula (1) or a compound represented by Formula (2) and colorant.

The actinic energy radiation curable composition (hereinafter referred to as photo polymerizable compound) of the present invention will be described.

Specific example of the actinic energy radiation according to the present invention include electron beam, ultraviolet ray, α ray, β ray, γ ray, or X ray. Of these, ultraviolet ray or electron beam is preferable, in view of risk for human body, easy-to-use, and widely spread in an industrial use.

Photo polymerizable compound according to the present invention can be used without limitation. Of these, photo-cationic polymerizable compound or radical polymerizable compound can be preferably used, and photo-cationic polymerizable compound is specifically preferable.

There are used a variety of known cationic polymerizable monomers as photo-cationic polymerizable compounds. Specific examples include epoxy compounds, vinyl ether compounds and oxetane compounds, as described in JP-A Nos. 6-9714, 2001-31892, 2001-40068, 2001-55507, 2001-310938, 2001-310937 and 2001-220526.

According to the present invention, it is preferable to include at least one kind of oxetane compound and at least one compound selected from epoxy compound and vinyl ether compound as photopolymerizable compound, in order to suppress shrinkage of a recording medium during ink curing.

Aromatic epoxides are preferably a di- or poly-glycidyl ether, which is prepared by the reaction of an at least one aromatic nucleus-containing polyphenols or its alkylene oxide adduct with epichlorohydrin. Examples thereof include a di- or poly-glycidyl ether of bisphenol A or its alkylene oxide adduct, a di- or poly-glycidyl ether of a hydrogenated bisphenol A or its alkylene oxide adduct, and a novolac type epoxy resin, in which ethylene oxide and propylene oxide are cited as an alkylene oxide.

An alicyclic epoxide is preferably a cyclohexane oxide or cyclopentene oxide containing compound, which is obtained by epoxidation of a compound containing a cycloalkane ring such as cyclohexane or cyclopenetene, with an appropriate oxidizing agent such as hydrogen peroxide or a peracid.

Preferred aliphatic epoxides include di- or poly-glycidyl ether of an aliphatic polyhydric alcohol or its alkylene oxide. Typical examples thereof include alkylene glycol diglydyl ether such as ethylene glycol diglycidyl ether, propylene glycol diglycidyl ether or 1,6-hexanediol diglycidyl ether; polyglycidyl ether of a polyhydric alcohol such as di- or tri-glycidyl ether of glycerin or its alkylene oxide adduct; and diglycidyl ether of polyalkylene glycol such as diglycidyl ether of polyethylene glycol or its polyalkylene oxide adduct and diglycidyl ether of polypropylene glycol or its alkylene oxide adduct, in which ethylene oxide and propylene oxide are cited as an alkylene oxide.

Of these epoxides, an aromatic epoxide or an alicyclic epoxide is preferred in terms of quick-curability, and an alicyclic epoxide is specifically preferred. In the invention, epoxides, as described above may be used alone or in combination thereof.

Vinyl ether compounds usable in the invention include, for example, di- or tri-vinyl ether compounds such as ethylene glycol divinyl ether, diethylene glycol divinyl ether, triethylene glycol divinyl ether, propylene glycol divinyl ether, dipropylene glycol divinyl ether, butanediol divinyl ether, hexanediol divinyl ether, cyclohexanedimethanol divinyl ether and trimethylolpropane trivinyl ether; and monovinyl ether compounds such as ethyl vinyl ether, n-butyl vinyl ether, isobutyl vinyl ether, octadecyl vinyl ether, cyclohexyl vinyl ether, hydroxylbutyl vinyl ether, 2-ethylhexyl vinyl ether, cyclohexanedimethanol monovinyl ether, n-propyl vinyl ether, isopropyl vinyl ether, isopropenyl ether-O-propylene carbonate, dodecyl vinyl ether, diethylene glycol monovinyl ether, and octadecyl vinyl ether.

Of these vinyl ether compounds, di- or tri-vinyl ether compounds are preferred and divinyl ether compounds are specifically preferred. The foregoing vinyl ether compounds may be used singly or in combination thereof.

Oxetane compound is defined as a compound having an oxetane ring. All well-known oxetane compounds disclosed in JP-A Nos. 2001-220526 and 2001-310937 can be usable.

Among oxetane compound relating to the present invention, in the case of using oxetane compound having 5 or more oxetane rings, it may happen to be difficult to handle due to high viscosity of ink composition, or to have an insufficient adhesion of obtained cured material due to higher glass transition temperature of an ink composition. Therefore, compound having 1-4 oxetane rings is preferable as the compound having oxetane rings relating to the present invention.

Compounds having oxetane ring preferably usable to the present invention include a compound represented by Formula (1) disclosed in paragraph 0089, a compound represented by Formula (2) disclosed in paragraph 0092, a compound represented by Formula (7) disclosed in paragraph 0107, a compound represented by Formula (8) disclosed in paragraph 0109, a compound represented by Formula (9) disclosed in paragraph 0166, in JP-A 2005-255821.

Specific examples include exemplified compounds 1-6 disclosed in paragraph 0104-0119 and compounds disclosed in paragraph 0121 in JP-A 2005-255821.

Next, radically polymerizable composition will be described.

In the ink according to the present invention, use of a radically polymerizable monomer is not limited. As a radically polymerizable monomer, disclosed is, for example, a photo-curable material using photo polymerizable compound and a photo curable resin by cationic polymerization in JP-A No. 7-159983, Examined Japanese Patent Application Publication (hereinafter referred to as JP-B) No. 7-31399, JP-A Nos. 8-224982 and 10-863; and recently a photo curable resin by cationic polymerization sensitized to longer wave length than visible light in JP-A Nos. 6-43633 and 8-324137.

A radically polymerizable compound according to the present invention is a compound having a radically polymerizable ethylenically-unsaturated bond. Any compound having at least one radically polymerizable ethylenically-unsaturated bond in the molecule may be usable, including a chemical form such as a monomer, oligomer, and polymer. Such a radically polymerizable monomer may be used individually, or combined use of at least 2 types at an appropriate ratio is applicable to enhance the targeted characteristics.

According to the present invention, the ink preferably includes at least one kind of photo-polymerization initiator in case of using ultraviolet ray as an actinic energy radiation. However, in case of using electron beam as an actinic energy radiation, in many cases, photo-polymerization initiator is not required.

Radical generating agents are broadly divided into two categories, such as an intramolecular bond cleavage type and an intramolecular hydrogen withdrawal type.

As examples of intramolecular bond cleavage type radical generating agents, listed are acetophenones such as diethoxyacetophenone, 2-hydroxy-2-methyl-1-phenylpropane-1-one, benzyldimethyl ketal, 1-(4-isopropylphenyl)-2-hydroxy-2-methylpropane-1-one, 4-(2-hydroxyethoxy)phenyl-(2-hydroxy-2-propyl)ketone, 1-hydroxycyclohexyl-phenyl ketone, 2-methyl-2-morpholino(4-thiomethylphenyl)propane-1-one, and 2-benzyl-2-dimethylamino-1-(4-morpholinopfenyl)-butanone; benzoins such as benzoin, benzoinmethyl ether, and benzoinisopropyl ether; an acyl phosphin oxides such as 2,4,6-trimethylbenzoindiphenylphospfin oxide; as well as benzyl and methylphenylglyoxy ester.

As examples of intramolecular hydrogen withdrawal type radical generation agents, listed are, for example, benzophenones such as benzophenone, o-methyl benzoylbenzoate-4-phenylbenzophenone, 4,4'-dichlorobenzophenone, hydroxybenzophenone, 4-benzoyl-4'-methyl-diphenylsulfide, acrylic benzophenone, 3,3',4,4'-tetra(t-butylperoxycarbonyl)benzophenone, and 3,3'-dimethyl-4-methoxybenzophenone; thioxanthones such as 2-isopropylthioxanthone, and 2,4-dichlorothioxanthone; aminobenzophenones such as Michler's ketone and 4,4'-diethylaminobenzophenone; as well as 10-butyl-2-chloroacridone, 2-ethylanthraquinone, 9,10-phenanthrenequinone, and campherquinone.

A content of photo-polymerization initiator is preferable in the range of 0.01-10.00% by mass based on the actinic radiation curable compound.

As radical polymerization initiators, there are listed triazine derivatives described in JP-B Nos. 59-1281 and 61-9621 and JP-A 60-60104; organic peroxides described in JP-A Nos. 59-1504 and 61-243807; diazonium compounds described in JP-B Nos. 43-23684, 44-6413, 44-6413, and 47-1604, and U.S. Pat. No. 3,567,453 specification; organic azide compounds described in U.S. Pat. Nos. 2,848,328, 2,852,379, and 2,940,853 specifications; ortho-quinonediazides described in JP-B Nos. 36-22062, 37-13109, 38-18015, and 45-9610; various kinds of onium compounds described in JP-B 55-39162, JP-A 59-14023, and "Macromolecules," Vol. 10, page 1307 (1977); azo compounds described in JP-A 59-142205; metal allene complexes described in JP-A 1-54440, European Patent Nos. 109,851 and 126,712, and "J. Imag. Sci.," Vol. 30, page 174 (1986); (oxo)sulfonium organic boron complexes described in JP-A Nos. 4-213861 and 4-255347; titanocenes described in JP-A 61-151197; transition metal complexes containing a transition metal such as ruthenium described in "Coordination Chemistry Review," Vol. 84, pages 85-277 (1988) and JP-A 2-182701; 2,4,5-triarylimidazole dimers and carbon tetrabromide described in JP-A 3-209477; and organic halogen compounds described in JP-A 59-107344. Any of these radical polymerization initiators is preferably contained in the range of 0.01-10 parts by mass, based on 100 parts by mass of a compound having a radically polymerizable ethylenically-unsaturated bond.

As a photo-cationic polymerization initiator usable for the ink of the present invention, well-known photolytically acid generating agents can be used.

As such a photolytically acid generating agent, any compound used, for example, for chemical sensitization-type photoresists and photo-cationic polymerization is used (refer to pages 187-192 of "Imaging Yo Yuki Zairyo (Organic Materials Used for Imaging Applications)" edited by Yuki Electronics Zairyo Kenkyukai published by Bunshin Shuppan (1993). Examples of compounds suitable for the present invention will now be listed.

Initially, there can be listed $B(C_6F_5)^{4-}, PF_6^-, AsF_6^-, SbF_6^-$, and $CF_3SO_3^-$ salts of aromatic onium compounds such as diazonium, ammonium, iodonium, sulfonium, and phosphonium.

Specific examples of such onium compounds usable for the present invention are compounds disclosed in paragraph 0132 in JP-A 2005-255821.

Secondly, sulfonated compounds generating sulfonic acid can be listed and specific compounds are compounds disclosed in paragraph 0136 in JP-A 2005-255821.

Thirdly, halides photolytically generating hydrogen halides are usable. Specific compounds are compounds disclosed in paragraph 0138 in JP-A 2005-255821.

Fourthly, iron-arene complexes can be listed which are disclosed in paragraph 0140 in JP-A 2005-255821.

Various well-known additives other than described above may be usable in the ink according to the invention as appropriate for the purpose of enhancing several performances such as ejection stability, compatibility with print head or ink cartridge, storage stability, storage image stability, or others. Specific example of additives include a viscosity regulating agents, specific resistance regulating agents, coated film forming agents, UV absorbent, antioxidant, anti-fading agents, anti-mold agents, and anti corrosion agents.

There can be employed a variety of recording media for the ink in the image forming of the invention without limitation. Specific example include a paper based recording medium such as a plain paper used in copy, an art paper, a conventional non-coated paper, a coated paper both face coated by resin, and non-absorptive plastics and their films used in soft packaging. Examples of plastic film include PET film, OPS film, OPP film, ONY film, PVC film, PE film, and TAC film. Further, metals and glass are also feasible.

The inkjet recording method relating to the present invention will now be described.

One of the preferred embodiments of the inkjet recording method relating to the present invention is the method in which ink comprises a compound represented by Formula (1) or a compound represented by Formula (2) and image is formed under the condition the different temperature between ink in the recording head and recording medium and after depositing on a recording medium, ink is solidified by increasing ink viscosity or gelling according to a decrease of temperature. The preferred embodiment is that a difference of a temperature between the temperature of the actinic energy radiation curable inkjet ink in the recording head and the temperature of the recording medium is not less than 25° C. and less than 100° C.

Temperature difference between the temperature of the actinic energy radiation curable inkjet ink and the temperature of the recording medium being not less than 25° C. enables to keep sufficient temperature difference between sol-gel phase transition temperature of the actinic energy radiation curable ink and recording medium, and to enhance an effect of increasing viscosity or gelling. Further, temperature difference being less than 100° C. can enhance an effect of increasing viscosity or gelling, because after the ink being deposited on the recording medium, heat of the ink rapidly diffuses through the recording medium and rapidly cooled.

As methods for the ink solidification by increasing viscosity or gelling, several method below can be applicable as appropriate: a method in which inkjet recording apparatus for inkjet recording is heated to the predetermined temperature under an ambience of relatively low temperature such as room temperature, followed by depositing ink on the recording medium and solidifying by natural cooling under the ambience temperature; or a method in which ink solidification is carried out by preliminary cooling a recording medium or forcing to blow cold air. A method in which an ink in a recording head is heated to higher temperature than room temperature is preferable due to its easy-to-use approach. As a method for heating an ink in recording head, listed is a method for heating directly or indirectly by heater incorporated inside or out side of a recording head, or a method for using a heat which is generated during driving recording head.

The other preferred embodiment of the inkjet recording method relating to the present invention is a method in which ink comprises a compound represented by Formula (1) or a compound represented by Formula (2) and image is formed under a condition of a difference of a temperature between the temperature of the actinic energy radiation curable inkjet ink in the recording head and the temperature of the recording medium being not less than 25° C. and less than 100° C., wherein there are 2 or more solidification measures of inkjet ink deposited on the recording medium and at least one of the solidification measure is using increase of viscosity or gelling described above. Further, preferred is that 2 or more solidification measures are by gelling and by curing via actinic energy radiation.

According to the present invention, image is formed by ejecting ink comprising the compound represented by Formula (1) or the compound represented by Formula (2) on the recording medium, followed by increasing viscosity or gelling ink droplets containing the compound represented by Formula (1) or the compound represented by Formula (2). Subsequently, ink is cured by irradiating actinic energy radiation such as ultraviolet ray or electron beam.

(Total Ink Film Thickness after Ink Deposition)

In the inkjet recording method of the present invention, after deposition of an ink onto a recording medium and then curing via irradiation of actinic energy radiation, the total ink film thickness is preferable 2-25 μm. Herein, the term "total ink film thickness" refers to the maximum value of ink film thickness of an image recorded on a recording medium. The meaning of the above total ink film thickness is the same as in cases in which recording is conducted via a single color inkjet recording method, as well as a 2-color superimposing (secondary color), 3-color superimposing, or 4-color superimposing (white ink base) inkjet recording method.

(Ink Ejection Conditions)

As ink ejection conditions, preferred is heating both recording head and ink at 10-40° C. higher than sol-gel phase transition temperature of the ink of the present invention and ejecting thereof from the viewpoint of ejection stability. By setting an ejecting temperature of the ink to be higher than sol-gel phase transition temperature by at least 10° C., gelling of ink due to temperature variations in the recording head can be prevented and ejection failure can be inhibited. Further, by setting an ejecting temperature of the ink to be higher than sol-gel phase transition temperature by at most 40° C., a time to reach to sol-gel phase transition temperature after deposition on the recording medium can be shorten and gelling rate can be accelerated, resulting in high image quality.

The ink relating to the present invention exhibits a broad viscosity range depending largely on the change of temperature, and viscosity variation directly affects the size and ejection rate of ink droplets, resulting in degradation of image quality. Consequently, it is necessary to maintain a constant temperature. The controlled range of ink temperature is preferably in the range of the predetermined temperature ±5° C., is more preferably in the range of the predetermined temperature ±2° C., but is further more preferably in the range of the predetermined temperature ±1° C. Herein, "the predetermined temperature" refers to the temperature determined as the temperature of the ink during ink ejection.

The droplet volume of the ink ejected from each ink nozzle is preferably in the range of 1 to 15 pl. The droplet volume of the ink is preferably in the range described above to form high resolution image, however, it becomes difficult to eject stably in this droplets volume range, as disclosed before. In the present invention, even when a droplet with small volume such as 1 to 15 pl is ejected, ejection stability is maintained, resulting in high resolution images.

(Actinic Energy Irradiation Conditions after Ink Deposition)

As an irradiation condition of actinic energy radiation in the inkjet recording method of the present invention, actinic energy radiation is preferably irradiated within 10 seconds after ink deposition, more preferably in the range of 0.001 second-5 second, but more preferably 0.001 second-2 second. To form highly detailed images, it is specifically preferable that the irradiation timing be as early as possible.

As the irradiation method of actinic energy radiation, the fundamental method is described in JP-A No. 60-132767 in which radiation sources are arranged on both sides of the head unit, and the head and the radiation sources are scanned via a shuttle system; then irradiation is carried out within a specified period of time after ink deposition; and further, curing is completed with another radiation source being stationary. In U.S. Pat. No. 6,145,979, disclosed are a method employing optical fibers and a method in which ultraviolet ray is irradiated to a recording portion by hitting collimated radiation onto a mirror surface provided on the side of the head unit. In the inkjet recording method of the present invention, any of these irradiation methods can be used.

Further, the following method is also one of the preferred embodiments: namely, actinic energy radiation irradiation is divided into two stages; initially, actinic energy radiation is irradiated 0.001-2.0 seconds after ink deposition via the above method; and after completion of entire printing, actinic energy radiation is further irradiated. Dividing actinic energy radiation irradiation into two stages makes it possible to inhibit contraction of a recording medium which tends to occur during ink curing.

(Electron Beam Irradiation)

The irradiation method of electron beam includes, for example, a scanning mode, a curtain beam mode and a broad beam mode, and a curtain beam mode is preferable with respect to a processing capacity.

By setting an acceleration voltage of electron beam in the range of 30-250 kV, cured film can be formed. Preferred is to set in the range of 30-100 kV in view of having the same curability with lower irradiation dose. By irradiating electron beam having acceleration voltage of 30-100 kV, electron beam can be concentrated at a surface of the recording medium when curing tends to be inhibited, resulting in enhancing curability. Consequently, in case of providing highly cured film under high concentration of oxygen, irradiation of electron beam having acceleration voltage of 30-100 kV is preferable.

Further, in case of setting an acceleration voltage of electron beam in the range of 30-100 kV, by choosing lower irradiation doze than usual, both energy saving by high energy efficiency and enhancing production efficiency by high speed printing can be achieved. In case of setting an acceleration voltage of electron beam in the range of 100-250 kV in the general electron beam irradiation, electron beam irradiation doze is preferably 30-100 kGy, more preferable 30-60 kGy. Herein, measurement of the electron beam irradiation doze can be carried out as bellows. As standard radiation source, γ ray from Co 60 is irradiated to an irradiation doze measurement film (RADIACHROMIC FILM FWT-60-00, produced by FARWEST) with thickness of 445 μm and calibration curve is prepared which shows a relation between absorbance by coloration of film and irradiation doze. The electron beam irradiation doze can be determined by using this calibration curve and absorbance.

As an electron beam irradiation apparatus, for example, listed are "CURETRON EBC-200-20-30" produced by Nisshin High Voltage Corp. or "Mini-EB" produced by AIT.

According to the inkjet recording method of the present invention, electron beam is preferably irradiated under oxygen concentration of 1000 ppm or less, more preferably 500 ppm or less. Herein, oxygen concentration of the present invention includes concentration range which can be achieved by inerting by using inert gas such as nitrogen or argon.

(Irradiation of Ultraviolet Ray)

As a light source of ultraviolet rays, utilized are such as a low pressure, medium pressure and high pressure mercury lamps and a metal halide lamp. A high pressure mercury lamp and a metal halide lamp are preferred with respect to the wavelength distribution of a light source, and a metal halide lamp is more preferable. Further, it is preferable to provide a filter to cut the light of wavelengths of not longer than 300 nm. The output power of a lamp is preferably 400 W-30 kW, the illuminance is preferably 10 mW/cm$^2$-10 kW/cm$^2$, and the irradiation energy is preferably 0.1-500 mJ/cm$^2$ and more preferably 1-100 mJ/cm$^2$.

In the case that ultraviolet rays having wavelengths of not longer than 300 nm are not contained in the wavelengths of a light source, or the case that the irradiation energy exceeds 500 mJ/cm$^2$, the mother nucleus of actinic energy radiation cross-linkable resin or incorporated various types of additives are decomposed by an ultraviolet ray. Therefore, they are not preferable because the effect of the present invention is not available and problem such as odor may occur due to decomposed products. Further, when the irradiation energy is less than 0.1 mJ/cm$^2$, the effects of this invention can not be effectively achieved due to inefficient cross-linking.

The illuminance of ultraviolet irradiation is preferable in the range of 0.1 mW/cm$^2$-1 W/cm$^2$. When the illuminance is more than 1 W/cm$^2$, the surface curing property of a coated layer is improved but the curing of the deep portion is decreased and results in layer having hardness at only surface. In this case, the hardness balance along the depth direction is not uniform and such as curling is generated, which is not preferable.

When the illuminance is lower than 10 mW/cm$^2$, cross-linking is not proceeded due to scattering in a film. The effects of this invention can not be effectively achieved, which is not preferable.

There exists a preferable illuminance range, even in the case of providing the same cumulative quantity of light (mJ/cm$^2$). It is because the transmittance of the light changes by illuminance Since the concentration distribution of a generated cross-linking reaction species varies depending on the transmittance of ultraviolet rays, a high concentration of a cross-linkable reaction species is generated in the surface layer to form a hard and close layer in the coated surface in the case of high illuminance of ultraviolet rays.

Next, an inkjet recording apparatus (hereinafter referred to simply as a recording apparatus) which can be used for the inkjet recording method of the present invention will now be described with reference to an ultraviolet radiation type apparatus as an example.

The recording apparatus which can be used for the inkjet recording method of the present invention is described with appropriate reference to accompanying drawings. Herein, the recording apparatus illustrated in drawings is the preferred embodiment of the present invention, without being restricted to the drawings.

FIG. 1 is a schematic cross-sectional view showing the constitution of a main section of a serial recording type inkjet recording apparatus. Recording apparatus 1 is constituted by having head carriage 2, recording head 3, irradiation member 4 which irradiates ultraviolet ray, and platen section 5. In recording apparatus 1, platen section 5 is arranged under recording medium P. Platen section 5 functions to absorb ultraviolet ray and absorbs any extra ultraviolet ray which has passed through recording medium P. Thereby, highly detailed images can be reproduced very stably.

Recording medium P is guided by guide member 6 and is conveyed from the front to the rear in FIG. 1 via the action of a conveying member (not shown). A recording head scanning member (not shown) allows head carriage 2 to reciprocate in direction Y in FIG. 1, whereby recording head 3 held by recording head carriage 2 is scanned.

Recording head carriage 2 is arranged on the upper side of recording medium P, and a plurality of recording heads 3, described later, corresponding to the number of colors used for image printing on recording medium P, are housed in such a manner that the ejection orifices (nozzles) are arranged on the lower side. Recording head carriage 2 is arranged for recording apparatus 1 main body to enable reciprocation in direction Y in FIG. 1. Via driving of the recording head scanning member, reciprocation is conducted in direction Y in FIG. 1.

Herein, FIG. 1 is drawn so that recording head carriage 2 houses recording heads 3 for white (W), yellow (Y), magenta (M), cyan (C), black (K), light yellow (Ly), light magenta (Lm), light cyan (Lc), light black (Lk), and white (W). In practice, the number of colors of recording heads 3 housed in head carriage 2 is appropriately determined.

Recording head 3 ejects an ink of the present invention fed by an ink feeding member (not shown) onto recording medium P from the ejection orifice via the action of a plurality of ejection members (not shown) provided within the interior. The ink ejected from recording head 3 comprises colorant, polymerizable monomer, and initiator other than gelling agent of the present invention, and the ink has properties to turn to a gel by cooling after depositing on the recording medium, and subsequently photopolymerization initiator act as catalyst by irradiation of ultraviolet ray, the ink has property to cure monomer via cross-linking and polymerization reaction.

Recording head 3 moves from one end of recording medium P to the other end thereof in direction Y in FIG. 1 via driving of the head scanning member. Then, during this scanning, the ink of the present invention is ejected onto a specified area (being a depositable area) of recording medium P in the form of ink droplets and then the ink droplets are deposited onto the depositable area.

The above scanning is carried out at a specified number of times to eject the actinic energy radiation curable inkjet ink onto one depositable area. Thereafter, recording medium P is appropriately moved from the front to the rear in FIG. 1 via the conveying member. While scanning using the scanning member is carried out again, the ink of the present invention is ejected onto a next depositable area adjacent to the above depositable area in the rearward direction in FIG. 1.

The above operation is repeated, and the actinic energy radiation curable ink is ejected from recording head 3 under synchronization with the head scanning member and the conveying member to form an image containing an aggregate of the actinic energy radiation curable inkjet ink droplets on recording medium P.

Irradiation member 4 is constituted by having an ultraviolet ray lamp which emits ultraviolet ray radiation having a specific wavelength range at stable exposure energy and a filter which transmits ultraviolet ray radiation of a specific wavelength. Herein, applicable ultraviolet ray lamps include mercury lamps, metal halide lamps, excimer lasers, ultraviolet ray lasers, cold-cathode tubes, hot-cathode tubes, blacklights, and LEDS (light emitting diodes). Of these, preferable are band-shaped metal halide lamps, cold-cathode tubes, hot-cathode tubes, mercury lamps, and blacklights. Preferable are low-pressure mercury lamps, hot-cathode tubes, cold-cathode tubes, and sterilization lamps especially emitting ultraviolet ray radiation of a wavelength of 254 nm, from the viewpoint of efficient bleeding prevention and dot diameter control. Use of a black light as a radiation source for irradiation member 4 makes it possible to inexpensively produce irradiation member 4 to cure a UV ink.

Irradiation member 4 is nearly similar in shape to the maximum capable of being set for recording apparatus 1 or is larger in shape than the depositable area among the depositable areas on which the UV ink is ejected via one scanning of recording head 3 driven by the head scanning member.

Irradiation member 4 is arranged via fixation on both sides of head carriage 2 to be nearly parallel to recording medium P.

As described above, illuminance in the ink ejection section is regulated, of course, by shielding entire recording head 3 from light. Further, it is effective that distance h1 between irradiation member 4 and recording medium P is set to be smaller than distance h2 between ink ejection section 31 of recording head 3 and recording medium P (namely, h1<h2); and also distance d between recording head 3 and irradiation member 4 is set to be far (namely, d is set to be large). Still further, it is more preferable that bellows structure 7 be arranged between recording head 3 and irradiation member 4.

Herein, it is possible to appropriately change the wavelength of ultraviolet ray radiation irradiated by irradiation member 4 by replacing an ultraviolet ray lamp or a filter provided for irradiation member 4.

The ink of the present invention exhibits excellent ejection stability and is specifically effective in printing by using line head type apparatus.

FIG. 2 is a top view showing an example of the constitution of a main section of a line head type inkjet recording apparatus. Each member which functions same as one in FIG. 1 is described by the same alphanumeric designation used in FIG. 1.

The inkjet recording apparatus shown in FIG. 2 is referred to as a line head system, and a plurality of inkjet recording heads 3 of individual colors are fixed and arranged on recording head carriage 2 to cover the entire width of recording medium P.

On the other hand, on the downstream side of recording head carriage 2, irradiation member 4 is provided via arrangement to cover the entire ink printing area, similarly to cover the entire width of recording medium P. As an ultraviolet ray lamp used for irradiation member 4, one similar to the one shown in FIG. 1 can be used.

In this line head system shown in FIG. 2, recording head carriage 2 and irradiation member 4 are fixed and only recording medium P is conveyed to carry out image formation via ink ejection and curing.

EXAMPLES

The present invention will now specifically be described with reference to Examples that by no means limit the scope of the present invention. Incidentally, the expression of "part" or "%" referred to in Examples represents "part by mass" or "% by mass" unless otherwise specified.

Example 1

<<Preparation of Actinic Energy Curable Inkjet Ink>>
[Preparation of Pigment Dispersion 1]

| | |
|---|---|
| Pigment: Black pigment Pigment Black 7 (#52 produced by Mitsubishi Chemical Corporation) | 20 parts |
| Pigment dispersant: PB822 (produced by Ajinomoto Fine-Techno Co., Inc.) | 9 parts |
| Polymerizable compound: Oxetane 221 (OXT221 di[1-ethyl(3-oxetanyl)] methylether, produced by Toagosei Co., Ltd.) | 71 parts |

By mixing the additives above, followed by milling by beads mill, Pigment dispersion 1 was prepared. Volume average particle diameter of Pigment dispersion 1 including the Black pigment was 80 nm by Zetasizer measurement (produced by Malvem Instruments Ltd.).

[Preparation of Ink 1]
Following additives were added and mixed in order. After heating at 80° C. and mixing, obtained liquid was filtered via metal mesh filter of #3000 while heating, followed by cooling to prepare Ink 1 as black ink.

| | |
|---|---|
| Polymerizable compound: Oxetane 221 (OXT221 produced by Toagosei Co., Ltd.) | 60 parts |
| Polymerizable compound: Celoxide 2021P (C2021P, alicyclic epoxy compound, produced by Dicel Chemical Industries, Ltd.) | 25 parts |
| Photopolymerization initiator: UVI 6992 (triphenyl sulfonium salt, Silacure UVI6992 produced by Dow Chemical Company) | 5 parts |
| Pigment dispersion 1 | 10 parts |

[Preparation of Ink 2]
Ink 2 was prepared by the same manner as Ink preparation of Ink 1, except for adding 12-hydroxy strearic acid (described as HAS in Table 1) as additive as described in Table 1 and changing heating temperature to 90° C.

[Preparation of Inks 3 and 4]
Inks 3 and 4 were prepared by the same manner as Ink preparation of Ink 1, except for adding N-lauroyl-L-glutamin acid-α,γ-dibutyl amide (described as LGBA in Table 1) as additive as described amount each in Table 1 and changing heating temperature to 130° C.

[Preparation of Inks 5-15]
Inks 5-15 were prepared by the same manner as Ink preparation of Ink 1, except for adding compound 1-3 represented by Formula (1) of the present invention as additive as described amount each in Table 1 and changing heating temperature to 130° C.

Herein, additives described in abbreviated names in Table 1 are detailed below.

OXT221: oxetane compound (OXT 221, di[1-ethyl (3-oxetanyl)]methyl ether, produced by Toagosei Co., Ltd.)

C2021P: alicyclic epoxy compound (Celoxide 2021P, produced by Dicel Chemical Industries, Ltd.)

UVI 6992: Photopolymerization initiator (UVI6992 produced by Dow Chemical Company)

<<Measurement of Each Property of Inks>>

Phase transition temperatures of Inks 1-15 prepared above were measured according to an evaluation method below. Results were listed in Table 1.

[Measurement of Phase Transition Temperature]

Test piece of each gel-like ink was placed on a melting point measurement apparatus (ATM-01, produced by AS ONE Corporation), and a temperature at which a test piece was melt was evaluated by heating with temperature elevating speed 5° C./minute or less. Phase transition temperature of this ink was calculated by averaging evaluation data of repeating 3 times, and rounding the average to one decimal place. Herein, no phase transitions were occurred in Ink 1 and Ink 5.

[Preparation of Ink 16]

Following additives were added and mixed in order. After heating at 80° C. and mixing, obtained liquid was filtered via metal mesh filter of #3000 while heating, followed by cooling to prepare Ink 16 as black ink

| | |
|---|---|
| Polymerizable compound: Tetraethyleneglycol diacrylate (TEGDA) | 30 parts |
| Polymerizable compound: Lauryl acrylate (RA) | 30 parts |
| Polymerizable compound: NK ester (A-400, produced by Shin-Nakamura Chemical Co., Ltd.) | 25 parts |
| Photopolymerization initiator: IRGACURE 907 (I-907 produced by Ciba Japan) | 5 parts |
| Pigment dispersion 2 | 10 parts |

[Preparation of Inks 17 and 18]

Inks 17 and 18 were prepared as the same manner as preparation of Ink 16, except for adding 5 parts and 10 parts each of the exemplified compound 1 represented by Formula (1) as the additive, and changing heating temperature to 130° C.

TABLE 1

| Ink No. | OXT221 (parts by mass) | C2021P (parts by mass) | UVI6992 (parts by mass) | Pigment dispersion (parts by mass) | Exemplified compound and others Species | Content (parts by mass) | Gelling | Phase transition temperature (° C.) | Remarks |
|---|---|---|---|---|---|---|---|---|---|
| 1 | 60.0 | 25.0 | 5.0 | 10.0 | — | 0 | No gelling | — | Comparative example |
| 2 | 39.0 | 16.0 | 5.0 | 10.0 | HSA | 30 | Gelling | 40 | Comparative example |
| 3 | 57.0 | 23.0 | 5.0 | 10.0 | LGBA | 5 | Gelling | 66 | Comparative example |
| 4 | 47.0 | 18.0 | 5.0 | 10.0 | LGBA | 20 | Gelling | 90 | Comparative example |
| 5 | 59.9 | 25.0 | 5.0 | 10.0 | 2 | 0.05 | No gelling | — | Comparative example |
| 6 | 59.6 | 25.0 | 5.0 | 10.0 | 1 | 0.4 | Gelling | 29 | Inventive example |
| 7 | 58.0 | 25.0 | 5.0 | 10.0 | 3 | 2 | Gelling | 61 | Inventive example |
| 8 | 57.0 | 23.0 | 5.0 | 10.0 | 1 | 5 | Gelling | 47 | Inventive example |
| 9 | 53.0 | 22.0 | 5.0 | 10.0 | 1 | 10 | Gelling | 55 | Inventive example |
| 10 | 53.0 | 22.0 | 5.0 | 10.0 | 2 | 10 | Gelling | 50 | Inventive example |
| 11 | 53.0 | 22.0 | 5.0 | 10.0 | 3 | 10 | Gelling | 77 | Inventive example |
| 12 | 50.0 | 20.0 | 5.0 | 10.0 | 1 | 15 | Gelling | 65 | Inventive example |
| 13 | 48.0 | 19.0 | 5.0 | 10.0 | 1 | 18 | Gelling | 73 | Inventive example |
| 14 | 48.0 | 19.0 | 5.0 | 10.0 | 3 | 19 | Gelling | 110 | Inventive example |
| 15 | 45.0 | 17.0 | 5.0 | 10.0 | 2 | 23 | Gelling | 70 | Comparative example |

Example 2

[Preparation of Pigment Dispersion 2]

By mixing the additives below, followed by milling by beads mill, Pigment dispersion 2 was prepared.

| | |
|---|---|
| Pigment: Black pigment Pigment Black 7 (#52 produced by Mitsubishi Chemical Corporation) | 20 parts |
| Pigment dispersant: PB822 (produced by Ajinomoto Fine-Techno Co., Inc.) | 9 parts |
| Polymerizable compound: Tetraethyleneglycol diacrylate (TEGDA) | 71 parts |

Herein, additives described in abbreviated names in Table 2 are detailed below.

RA: Lauryl acrylate

TEGDA: Tetraethyleneglycol diacrylate

A-400: NK ester (produced by Shin-Nakamura Chemical Co., Ltd.)

I-907: IRGACURE907 (produced by Ciba Japan)

<<Measurement of Each Property of Inks>>

Phase transition temperatures of Inks 16-18 prepared above were measured according to the same evaluation method as Example 1. Results were listed in Table 2. Herein, no phase transition was occurred in Ink 16.

TABLE 2

| Ink No. | RA (parts by mass) | TEGA (parts by mass) | A-400 (parts by mass) | I-907 (parts by mass) | Pigment dispersion (parts by mass) | Exemplified compound and others Species | Content (parts by mass) | Gelling | Phase transition temperature (° C.) | Remarks |
|---|---|---|---|---|---|---|---|---|---|---|
| 16 | 30.0 | 30.0 | 25.0 | 5.0 | 10.0 | — | 0 | No gelling | — | Comparative example |
| 17 | 30.0 | 25.0 | 25.0 | 5.0 | 10.0 | 1 | 5 | Gelling | 43 | Inventive example |
| 18 | 25.0 | 25.0 | 25.0 | 5.0 | 10.0 | 1 | 10 | Gelling | 50 | Inventive example |

Example 3

<<Formation of Inkjet Image>>

By employing a line head printer loaded with a line head system piezo type recording head, employing each of Inks 1-18, onto PPC paper (J PAPER produced by Konica Minolta Business Solutions, Inc.), art paper for printing (SA Kinfuji produced by OJI PAPER), cast coated printing paper (Mirror Coat Gold produced by OJI PAPER), and coated printing paper (OK matt Coat Green 100 produced by OJI PAPER), characters of "口,国,日,国,民,黑 黒,国,日,国,對" by MS Mincho font character in 4, 5, 6 point each, a black solid image, and a image for measurement of dot diameter in which pixels were arranged at 360 dpi intervals were printed. Consequently, Images 1-18 corresponding to Ink Nos. 1-18 were obtained. Ink supply system comprises an ink feeding system such as an ink tank constituting the head carriage, a feeding pipe, and a pre-chamber ink tank just prior to the head, piping with filters, and a piezo head. Portion from the pre-chamber ink tank to recording head was thermally insulated and heated at a temperature of phase transition temperature of ink +20° C. Further, by incorporating heater in piezo head, ink in the recording head was heated at a temperature of phase transition temperature of ink +20° C. With respect to an ink which gelling does not occur, all inks were heated at 80° C. Print was carried out by using piezo head having 256 nozzles at a nozzle aperture diameter of 25 μm (128 nozzles×2 lines, arranged in zigzag alignment, and nozzle pitch in one line being 360 dpi), under conditions of an amount of one droplet of 4 pl, an ejected droplet speed of about 8 msec and a recording resolution of 1440×1440 dpi. Temperature of each recording medium was kept at room temperature. At 0.5 second after depositing each ink, ink was cured by irradiating by ultraviolet ray via high pressure mercury lamp VZero085 (produced by INTEGRATION TECHNOLOGY) arranged at upper part of carriage, with energy density of 140 W/cm$^2$ and illuminance of 20 mJ/cm$^2$ (accumulated illuminance). Herein, the illuminance of irradiation source was measured and displayed by using UV PF-A1 produced by Iwasaki Electric Co., Ltd. with accumulated illuminance at 254 nm. Further, image formation described above was carried out under an ambient of 25° C. and 55% R.H. Herein, dpi as described in the present invention represents the number of dots per 2.54 cm.

<<Evaluation of Formed Image>>

Above formed images 1-18 were evaluated with respect to bleed-through resistance for plain paper, character quality, dot diameter variation, curability by ultraviolet ray, ink thixotropy, ink storage stability and ejection stability, according to the method below.

[Evaluation of Bleed-Through Resistance for Plain Paper]

According to above method, black solid image was prepared on PPC paper (J PAPER produced by Konica Minolta Business Solutions Japan Co., Ltd.). Optical density of rear side thereof was determined by optical densitometer (Optical densitometer 938 produced by X-Rite). Further, optical density of unrecorded portion on the same paper was also determined.

Thereafter, the difference of density was calculated by the following formula:

(Density of the rear side of Black solid image)−(Density of the unprinted image portion), whereby bleed-through resistance was evaluated based on the following criteria.

A: Difference of density was less than 0.05.
B: Difference of density was more than 0.05 and less than 0.08.
C: Difference of density was more than 0.08 and less than 0.12.
D: Difference of density was more than 0.12.

[Evaluation of Character Quality]

According to above method, onto art paper for printing (SA Kinfuji produced by OJI PAPER), characters of "口,国,日,国,民,黑 黒,国,日,国,對" by MS Mincho font character in 3, 4, 5 point each were printed with a recording resolution of 1440×1440 dpi, and the resulting characters were evaluated by visual examination based on the following criteria.

A: All of 4 point characters were recorded clearly in detail.
B: Only part of 4 point characters was legible, but all of 5 point characters were legible.
C: Only part of 4 and 5 point characters was legible, but all of 6 point characters were legible.
D: Some of 6 point characters were illegible.

[Evaluation of Variation of Dot Diameter]

According to above method, onto three kind of papers such as art paper for printing (SA Kinfuji produced by OJI PAPER), cast coated printing paper (Minor Coat Gold produced by OJI PAPER) and coated printing paper (OK matt Coat Green 100 produced by OJI PAPER), a image for measurement of dot diameter in which pixels were arranged at 360 dpi intervals were printed. Dot diameters of 20 dots on each paper were determined by using optical microscope (VHX-500 produced by KEYENCE) and average dot diameter was calculated. Thereafter, index of dot diameter variation was calculated according to an expression below and the resulting index of dot diameter variation was evaluated based on the following criteria.

Index of dot diameter variation=(Average dot diameter on the paper having maximum average dot diameter)/(Average dot diameter on the paper having minimum average dot diameter)

A: Index of dot diameter variation was more than 1.00 and less than 1.15.
B: Index of dot diameter variation was more than 1.15 and less than 1.30.
C: Index of dot diameter variation was more than 1.30 and less than 1.50.
D: Index of dot diameter variation was more than 1.50.

[Evaluation of Curability by Ultraviolet Ray]

A cellophane tape (registered trademark) was allowed to adhere to the solid image printed onto the art paper. Thereafter, the state of image after peeling off the cellophane tape vertically was visually observed and evaluated based on the following criteria.

A: No peeling of image and no change of image surface was noted at all.
B: No peeling of image was noted, however at least a part of image became cloudy.
C: Peeling of image was slightly noted at edge of image.
D: Peeling of image was apparently noted.

[Evaluation of Ink Thixotropy]

Viscosity of Inks 1-18 were measured by using Viscoelasticity measurement apparatus (USD-300; produced by Paar Physica) at shear rate of 1 sec and 1000 sec. Temperature of the ink was set at phase transition temperature +20° C. in case of gelling ink and at 80° C. in case of ink without gelling. Thereafter, Index of ink thixotropy was evaluated based on the calculation by the following expression.

Index of ink thixotropy=(Viscosity at shear rate 1 sec)/(Viscosity at shear rate 1000 sec)

A: Index of ink thixotropy was more than 0.98 and less than 1.02.

B: Index of ink thixotropy was more than 0.90 and less than 0.98; or more than 1.02 and less than 1.10.

C: Index of ink thixotropy was more than 0.75 and less than 0.90; or more than 1.10 and less than 1.25.

D: Index of ink thixotropy was less than 0.75 or more than 1.25.

[Evaluation of Ink Storage Stability]

Inks 1-18 each was stored in a glass bottle with airtight stopper at 0° C. and 23° C. for 14 days. After storage, the ink stored at 0° C. was allowed to room temperature, and ink storage stability was observed by comparing the state of the two inks and evaluated based on the following criteria.

A: No difference was noticed between two inks

B: Slightly separated liquid was noticed at the surface of the ink stored at 0° C.

C: Slightly separated liquid was noticed at the entirely of the ink stored at 0° C.

D: Separated liquid was noticed at the entirely of the ink stored at 0° C.

[Evaluation of Ejection Stability]

Printer employing each of above prepared inks was put in the cycled ambience in which temperature was changed in the range of 10-40° C. in 12 hours per 1 cycle, and repeated 3 cycles. Thereafter, nozzle ejection failure and curved ejection was visually observed and ejection stability was evaluated based on the following criteria.

A: No nozzle ejection failure was observed.

B: At 1-6 nozzles among all of 256 nozzles, ejection direction was shifted.

C: At 1-2 nozzles among all of 256 nozzles, ejection failure was observed.

D: At 3 or more nozzles among all of 256 nozzles, ejection failure was observed.

Results were listed in Table 3.

TABLE 3

| | Evaluation of formed images | | | | Evaluation of Ink properties | | | |
|---|---|---|---|---|---|---|---|---|
| Image No. | Bleed-through resistance for plain paper | Character Quality | Variation of Dot diameter | Curability by Ultraviolet ray | Ink thixotropy | Ink storage stability | Ejection stability | Remarks |
| 1 | D | D | D | A | A | A | A | Comp. |
| 2 | B | B | C | B | D | D | D | Comp. |
| 3 | B | B | C | B | C | C | B | Comp. |
| 4 | B | B | B | C | C | C | C | Comp. |
| 5 | D | D | D | A | A | A | A | Comp. |
| 6 | C | B | C | A | A | A | A | Inv. |
| 7 | B | A | A | A | A | A | A | Inv. |
| 8 | B | A | B | A | A | A | A | Inv. |
| 9 | A | A | A | A | A | A | A | Inv. |
| 10 | B | A | A | A | A | A | A | Inv. |
| 11 | A | A | A | A | A | A | A | Inv. |
| 12 | A | A | A | A | A | A | A | Inv. |
| 13 | A | A | A | B | B | B | B | Inv. |
| 14 | A | A | A | B | B | C | C | Inv. |
| 15 | A | A | A | D | C | C | C | Comp. |
| 16 | D | D | D | A | A | A | A | Comp. |
| 17 | B | B | B | A | A | A | A | Inv. |
| 18 | B | A | A | A | A | A | A | Inv. |

Comp.: Comparative example, Inv.: Inventive example

As can clearly seen from Table 3, the actinic energy radiation curable inkjet inks comprising a compound represented by Formula (1) according to the present invention were superior to Comparative Examples in each of character quality and bleed-through resistance of formed image, further little ink thixotropy, resulting in excellent ejection stability and ink storage stability, and still further excellent curability by ultraviolet ray of formed image.

Example 4

<<Formation and Evaluation of Inkjet Image>>

By employing a line head printer described in Example 3, Image Nos. 19-27 were printed onto PPC paper (J PAPER produced by Konica Minolta Business Solutions, Inc.), art paper for printing (SA Kinfuji produced by OJI PAPER), cast coated printing paper (Mirror Coat Gold produced by OJI PAPER), and coated printing paper (OK matt Coat Green 100 produced by OJI PAPER), as the same manner as Example 3, except for employing Inks 2 and 9 of Example 1 and temperature of recording head and ink in the recording head and recording medium being the temperature described in Table 4. Character quality, variation of dot diameter, and ejection stability were evaluated as the same manner as Example 3. Results were listed in Table 4.

TABLE 4

| Image No. | Ink No. | Phase transition Temperature (° C.) | Temperature of Recording head (° C.) | Temperature of Recording medium (° C.) | Evaluation of formed images Character Quality | Variation of Dot diameter | Ejection stability | Remarks |
|---|---|---|---|---|---|---|---|---|
| 19 | 2 | 40 | 60 | 25 | B | B | D | Comparative example |
| 20 | 2 | 40 | 45 | 25 | C | B | D | Comparative example |
| 21 | 2 | 40 | 100 | 15 | C | C | D | Comparative example |
| 22 | 9 | 55 | 65 | 45 | B | C | B | Inventive example |
| 23 | 9 | 55 | 120 | 15 | B | B | B | Inventive example |
| 24 | 9 | 55 | 60 | 25 | A | B | C | Inventive example |
| 25 | 9 | 55 | 100 | 25 | A | B | A | Inventive example |
| 26 | 9 | 55 | 70 | 25 | A | A | A | Inventive example |
| 27 | 9 | 55 | 85 | 25 | A | A | A | Inventive example |

As can clearly seen from Table 4, the actinic energy radiation curable inkjet ink each of the present invention exhibits excellent character quality of formed image, small variation of dot diameter, and further excellent ejection stability, comparing to Comparative Examples. Further, by arranging a heating temperature of recording head and recording medium, better character quality of formed image, small variation of dot diameter, and further good ejection stability can be obtained.

Example 5

<<Preparation of Pigment Dispersion>>
[Preparation of Yellow Pigment Dispersion 1]

| | |
|---|---|
| Pigment: Yellow pigment (Novoperm P-HG, produced by Clariant) | 15 parts |
| Pigment dispersant: PB822 (produced by Ajinomoto Fine-Techno Co., Inc.) | 5 parts |
| Oxetane compound (OXT221, produced by Toagosei Co., Ltd.) | 80 parts |

By mixing the additives above, followed by milling by beads mill, Yellow Pigment dispersion 1 was prepared. Volume average particle diameter of pigment in Yellow Pigment dispersion 1 was measured to be 120 nm by Zetasizer 1000 (produced by Malvern Instruments Ltd.).

[Preparation of Magenta Pigment Dispersion 1]

| | |
|---|---|
| Pigment: Magenta pigment (Hostaperm Pink E, produced by Clariant) | 15 parts |
| Pigment dispersant: PB822 (produced by Ajinomoto Fine-Techno Co., Inc.) | 5 parts |
| Oxetane compound (OXT221, produced by Toagosei Co., Ltd.) | 80 parts |

By mixing the additives above, followed by milling by beads mill, Magenta Pigment dispersion 1 was prepared. Volume average particle diameter of pigment in Magenta Pigment dispersion 1 was measured to be 100 nm by Zetasizer 1000 (produced by Malvern Instruments Ltd.).

[Preparation of Cyan Pigment Dispersion 1]

| | |
|---|---|
| Pigment: Cyan pigment (Hostaperm Blue B2G, produced by Clariant) | 20 parts |
| Pigment dispersant: PB822 (produced by Ajinomoto Fine-Techno Co., Inc.) | 5 parts |
| Oxetane compound (OXT221, produced by Toagosei Co., Ltd.) | 75 parts |

By mixing the additives above, followed by milling by beads mill, Cyan Pigment dispersion 1 was prepared. Volume average particle diameter of pigment in Cyan Pigment dispersion 1 was measured to be 85 nm by Zetasizer 1000 (produced by Malvem Instruments Ltd.).

[Preparation of Black Pigment Dispersion 1]

Black Pigment dispersion described in Example 1 was used.

<<Preparation of Ink Set>>

Ink set was prepared which comprise each color ink bellow.

[Preparation of Yellow Ink]

Following additives were added and mixed in order. After heating at 130° C. and mixing, obtained liquid was filtered via metal mesh filter of #3000 while heating, followed by cooling to prepare Yellow Ink.

| | |
|---|---|
| Polymerizable compound: Oxetane 221 (OXT221 produced by Toagosei Co., Ltd.) | 35 parts |
| Polymerizable compound: Celoxide 2021P (C2021P, alicyclic epoxy compound, produced by Dicel Chemical Industries, Ltd.) | 20 parts |
| Photopolymerization initiator: UVI 6992 (triphenyl sulfonium salt, Silacure UVI6992 produced by Dow Chemical Company) | 5 parts |
| Yellow Pigment dispersion 1 | 30 parts |
| Exemplified compound 1 represented by Formula (1) of the present invention | 10 parts |

[Preparation of Magenta Ink]

Following additives were added and mixed in order. After heating at 130° C. and mixing, obtained liquid was filtered via metal mesh filter of #3000 while heating, followed by cooling to prepare Magenta Ink.

| | |
|---|---|
| Polymerizable compound: Oxetane 221 (OXT221 produced by Toagosei Co., Ltd.) | 45 parts |
| Polymerizable compound: Celoxide 2021P (C2021P, alicyclic epoxy compound, produced by Dicel Chemical Industries, Ltd.) | 20 parts |
| Photopolymerization initiator: UVI6992 (triphenyl sulfonium salt, Silacure UVI6992 produced by Dow Chemical Company) | 5 parts |
| Magenta Pigment dispersion 1 | 20 parts |
| Exemplified compound 1 represented by Formula (1) of the present invention | 10 parts |

[Preparation of Cyan Ink]

Following additives were added and mixed in order. After heating at 130° C. and mixing, obtained liquid was filtered via metal mesh filter of #3000 while heating, followed by cooling to prepare Cyan Ink

| | |
|---|---|
| Polymerizable compound: Oxetane 221 (OXT221 produced by Toagosei Co., Ltd.) | 55 parts |
| Polymerizable compound: Celoxide 2021P (C2021P, alicyclic epoxy compound, produced by Dicel Chemical Industries, Ltd.) | 20 parts |
| Photopolymerization initiator: UVI6992 (triphenyl sulfonium salt, Silacure UVI6992 produced by Dow Chemical Company) | 5 parts |
| Cyan Pigment dispersion 1 | 10 parts |
| Exemplified compound 1 represented by Formula (1) of the present invention | 10 parts |

[Preparation of Black Ink]

Following additives were added and mixed in order. After heating at 130° C. and mixing, obtained liquid was filtered via metal mesh filter of #3000 while heating, followed by cooling to prepare Black Ink.

| | |
|---|---|
| Polymerizable compound: Oxetane 221 (OXT221 produced by Toagosei Co., Ltd.) | 45 parts |
| Polymerizable compound: Celoxide 2021P (C2021P, alicyclic epoxy compound, produced by Dicel Chemical Industries, Ltd.) | 20 parts |
| Photopolymerization initiator: UVI6992 (triphenyl sulfonium salt, Silacure UVI6992 produced by Dow Chemical Company) | 5 parts |
| Black Pigment dispersion 1 | 20 parts |
| Exemplified compound 1 represented by Formula (1) of the present invention | 10 parts |

[Preparation of Light Magenta Ink]

Following additives were added and mixed in order. After heating at 130° C. and mixing, obtained liquid was filtered via metal mesh filter of #3000 while heating, followed by cooling to prepare Light Magenta Ink.

| | |
|---|---|
| Polymerizable compound: Oxetane 221 (OXT221 produced by Toagosei Co., Ltd.) | 55 parts |
| Polymerizable compound: Celoxide 2021P (C2021P, alicyclic epoxy compound, produced by Dicel Chemical Industries, Ltd.) | 25 parts |
| Photopolymerization initiator: UVI 6992 (triphenyl sulfonium salt, Silacure UVI6992 produced by Dow Chemical Company) | 5 parts |
| Magenta Pigment dispersion 1 | 5 parts |
| Exemplified compound 1 represented by Formula (1) of the present invention | 10 parts |

[Preparation of Light Cyan Ink]

Following additives were added and mixed in order. After heating at 130° C. and mixing, obtained liquid was filtered via metal mesh filter of #3000 while heating, followed by cooling to prepare Light Cyan Ink.

| | |
|---|---|
| Polymerizable compound: Oxetane 221 (OXT221 produced by Toagosei Co., Ltd.) | 58 parts |
| Polymerizable compound: Celoxide 2021P (C2021P, alicyclic epoxy compound, produced by Dicel Chemical Industries, Ltd.) | 25 parts |
| Photopolymerization initiator: UVI 6992 (triphenyl sulfonium salt, Silacure UVI6992 produced by Dow Chemical Company) | 5 parts |
| Cyan Pigment dispersion 1 | 2 parts |
| Exemplified compound 1 represented by Formula (1) of the present invention | 10 parts |

<<Measurement of Each Ink Properties>>

Phase transition temperature of each color ink obtained above was measured by the same method described in Example 1. Results were listed in Table 5.

TABLE 5

| | Ink composition (parts by mass) | | | | | Phase transition temperature (° C.) |
|---|---|---|---|---|---|---|
| Ink species | OXT221 | C2021P | UVI6992 | Pigment dispersion | Exemplified compound 1 | |
| Yellow ink | 35 | 20 | 5 | 30 | 10 | 53 |
| Magenta Ink | 45 | 20 | 5 | 20 | 10 | 54 |
| Cyan Ink | 55 | 20 | 5 | 10 | 10 | 55 |
| Black Ink | 45 | 20 | 5 | 20 | 10 | 52 |
| Light Magenta Ink | 55 | 25 | 5 | 5 | 10 | 56 |
| Light Cyan Ink | 58 | 25 | 5 | 2 | 10 | 57 |

<<Formation and Evaluation of Inkjet Image>>

By employing a line head printer described in Example 3, loaded with 6 line heads arranged in the paper conveying direction, and employing 6 colored inks, Mincho font character in 3 point and Image of JIS/SCID N5 "bicycle" pattern were printed onto PPC paper (J PAPER produced by Konica Minolta Business Solutions, Inc.), art paper for printing (SA Kinfuji produced by OJI PAPER), cast coated printing paper (Mirror Coat Gold produced by OJI PAPER), and coated printing paper (OK matt Coat Green 100 produced by OJI PAPER), as the same manner as Example 3. Character quality, bleed-through resistance, variation of dot diameter, curability by ultraviolet ray and ejection stability were evaluated as the same manner as Example 3. In all evaluation items, excellent effect can be confirmed. Further, by visual inspection of obtained Pattern of JIS/SCID N5 "bicycle", it is confirmed that image degradation by coalescence of droplets cannot be observed and images having excellent sharpness, high optical density can be obtained.

Example 6

<<Preparation of Actinic Energy Radiation Curable Inkjet Ink>>

[Preparation of Pigment Dispersion 11]

| | |
|---|---|
| Pigment: Black pigment Pigment Black 7 (#52 produced by Mitsubishi Chemical Corporation) | 20 parts |
| Pigment dispersant: PB822 (produced by Ajinomoto Fine-Techno Co., Inc.) | 9 parts |
| Polymerizable compound: Oxetane 221 (OXT221, produced by Toagosei Co., Ltd.) | 71 parts |

By mixing the additives above, followed by milling by beads mill, Pigment dispersion 11 was prepared. Volume average particle diameter of Pigment dispersion 11 including the Black pigment was 80 nm by Zetasizer measurement (produced by Malvern Instruments Ltd.).

[Preparation of Ink 101]

Following additives were added and mixed in order. After heating at 80° C. and mixing, obtained liquid was filtered via metal mesh filter of #3000 while heating, followed by cooling to prepare Ink 101 as black ink.

| | |
|---|---|
| Polymerizable compound: Oxetane 221 (OXT221 produced by Toagosei Co., Ltd.) | 60 parts |
| Polymerizable compound: Celoxide 2021P (C2021P, produced by Dicel Chemical Industries, Ltd.) | 25 parts |
| Photopolymerization initiator: UVI 6992 (produced by Dow Chemical Company) | 5 parts |
| Pigment dispersion 11 | 10 parts |

[Preparation of Ink 102]

Ink 102 was prepared by the same manner as Ink preparation of Ink 101, except for adding 12-hydroxy strearic acid (described as HAS in Table 6) as additive as described in Table 6 and changing heating temperature to 90° C.

[Preparation of Inks 103 and 104]

Inks 103 and 104 were prepared by the same manner as Ink preparation of Ink 101, except for adding N-lauroyl-L-glutamin acid-α,γ-dibutyl amide (described as LGBA in Table 6) as additive as described amount each in Table 6 and changing heating temperature to 130° C.

[Preparation of Inks 105-114]

Inks 105-114 were prepared by the same manner as Ink preparation of Ink 101, except for adding Exemplified compounds I, II and IV represented by Formula (2) of the present invention as additive as described amount each in Table 6 and changing heating temperature to 130° C.

In Table 6, OXT221 is oxetane compound and C2021P is alicyclic epoxy compound.

[Preparation of Pigment Dispersion 12]

| | |
|---|---|
| Pigment: Black pigment Pigment Black 7 (#52 produced by Mitsubishi Chemical Corporation) | 20 parts |
| Pigment dispersant: PB822 (produced by Ajinomoto Fine-Techno Co., Inc.) | 9 parts |
| Polymerizable compound: Tetraethyleneglycol diacrylate (TEGDA) | 71 parts |

By mixing the additives above, followed by milling by beads mill, Pigment dispersion 12 was prepared.

[Preparation of Ink 115]

Following additives were added and mixed in order. After heating at 80° C. and mixing, obtained liquid was filtered via metal mesh filter of #3000 while heating, followed by cooling to prepare Ink 115 as black ink.

| | |
|---|---|
| Polymerizable compound: Tetraethyleneglycol diacrylate (TEGDA) | 30 parts |
| Polymerizable compound: Lauryl acrylate (RA) | 30 parts |
| Polymerizable compound: NK ester (A-400, produced by Shin-Nakamura Chemical Co., Ltd.) | 25 parts |
| Photopolymerization initiator: IRGACURE907 (I-907 produced by Ciba Japan) | 5 parts |
| Pigment dispersion 12 | 10 parts |

[Preparation of Inks 116 and 117]

Inks 116 and 117 were prepared as the same manner as preparation of Ink 115, except for adding 5 parts each of the exemplified compounds I and IV represented by Formula (2) as the additive, and changing heating temperature to 130° C.

<<Measurement of Each Property of Inks>>

Phase transition temperatures for Inks 101-117 prepared above were measured according to an evaluation method below. Results were listed in Tables 6 and 7.

[Measurement of Phase Transition Temperature]

Test piece of each gel-like ink was placed on a melting point measurement apparatus (ATM-01, produced by AS ONE Corporation), and a temperature at which a test piece was melt was evaluated by heating with temperature elevating speed 5° C./minute or less. Phase transition temperature of this ink was calculated by averaging evaluation data of repeating 3 times, and rounding the average to one decimal place. Herein, no phase transitions were occurred in Inks 101, 105 and 115.

TABLE 6

| Ink No. | OXT221 (parts by mass) | C2021P (parts by mass) | UVI6992 (parts by mass) | Pigment dispersion (parts by mass) | Exemplified compound and others | | Gelling | Phase transition temperature (° C.) | Remarks |
|---|---|---|---|---|---|---|---|---|---|
| | | | | | Species | Content (parts by mass) | | | |
| 101 | 60.0 | 25.0 | 5.0 | 10.0 | — | 0 | No gelling | — | Comparative example |
| 102 | 39.0 | 16.0 | 5.0 | 10.0 | HSA | 30 | Gelling | 40 | Comparative example |
| 103 | 57.0 | 23.0 | 5.0 | 10.0 | LGBA | 5 | Gelling | 66 | Comparative example |
| 104 | 47.0 | 18.0 | 5.0 | 10.0 | LGBA | 20 | Gelling | 90 | Comparative example |
| 105 | 59.9 | 25.0 | 5.0 | 10.0 | II | 0.05 | No gelling | — | Comparative example |
| 106 | 59.0 | 25.0 | 5.0 | 10.0 | I | 1 | Gelling | 40 | Inventive example |
| 107 | 59.0 | 25.0 | 5.0 | 10.0 | IV | 1 | Gelling | 51 | Inventive example |
| 108 | 57.0 | 23.0 | 5.0 | 10.0 | I | 5 | Gelling | 50 | Inventive example |
| 109 | 57.0 | 23.0 | 5.0 | 10.0 | II | 5 | Gelling | 46 | Inventive example |
| 110 | 53.0 | 22.0 | 5.0 | 10.0 | I | 10 | Gelling | 55 | Inventive example |
| 111 | 53.0 | 22.0 | 5.0 | 10.0 | IV | 10 | Gelling | 80 | Inventive example |
| 112 | 48.0 | 19.0 | 5.0 | 10.0 | II | 18 | Gelling | 59 | Inventive example |
| 113 | 48.0 | 19.0 | 5.0 | 10.0 | IV | 18 | Gelling | 105 | Inventive example |
| 114 | 44.0 | 16.0 | 5.0 | 10.0 | I | 25 | Gelling | 75 | Comparative example |

TABLE 7

| Ink No. | RA (parts by mass) | TEGA (parts by mass) | A-400 (parts by mass) | I-907 (parts by mass) | Pigment dispersion (parts by mass) | Exemplified compound and others | | Gelling | Phase transition temperature (° C.) | Remarks |
|---|---|---|---|---|---|---|---|---|---|---|
| | | | | | | Species | Content (parts by mass) | | | |
| 115 | 30.0 | 30.0 | 25.0 | 5.0 | 10.0 | — | 0 | No gelling | — | Comparative example |
| 116 | 30.0 | 25.0 | 25.0 | 5.0 | 10.0 | I | 5 | Gelling | 45 | Inventive example |
| 117 | 30.0 | 25.0 | 25.0 | 5.0 | 10.0 | IV | 5 | Gelling | 62 | Inventive example |

<<Formation of Inkjet Image>>

By employing a line head printer loaded with a line head system piezo type recording head, employing each of Inks, onto PPC paper (J PAPER produced by Konica Minolta Business Solutions, Inc.), art paper for printing (SA Kinfuji produced by OJI PAPER), cast coated printing paper (Minor Coat Gold produced by OJI PAPER), and coated printing paper (OK matt Coat Green 100 produced by OJI PAPER), characters of 口, 図, 日, 民, 氏, 困, 間, 匡, 日, 国, 宵 MS Mincho font character in 4, 5, 6 point each, a black solid image, and a image for measurement of dot diameter in which pixels were arranged at 360 dpi intervals were printed. Consequently, Images 101-117 were obtained.

Ink supply system comprises an ink feeding system such as an ink tank constituting the head carriage, a feeding pipe, and a pre-chamber ink tank just prior to the head, piping with filters, and a piezo head. Portion from the pre-chamber ink tank to recording head was thermally insulated and heated at a temperature of phase transition temperature of ink +20° C. Further, by incorporating heater in piezo head, ink in the recording head was heated at a temperature of phase transition temperature of ink +20° C. With respect to an ink which gelling does not occur, all inks were heated at 80° C. Print was carried out by using piezo head having 256 nozzles at a nozzle aperture diameter of 25 μm (128 nozzles×2 lines, arranged in zigzag alignment, and nozzle pitch in one line being 360 dpi), under conditions of an amount of one droplet of 4 pl, an ejected droplet speed of about 8 msec and a recording resolution of 1440×1440 dpi. Temperature of each recording medium was kept at room temperature.

At 0.5 second after depositing each ink, ink was cured by irradiating by ultraviolet ray via high pressure mercury lamp VZero085 (produced by INTEGRATION TECHNOLOGY) arranged at upper part of carriage, with energy density of 140 W/cm$^2$ and illuminance of 20 mJ/cm$^2$ (accumulated illuminance). Herein, the illuminance of irradiation source was measured and displayed by using UV PF-A1 produced by Iwasaki Electric Co., Ltd. with accumulated illuminance at 254 nm. Further, image formation described above was carried out under an ambient of 25° C. and 55% R.H. Herein, dpi as described in the present invention represents the number of dots per 2.54 cm.

<<Evaluation of Formed Image>>

Above formed images 101-117 were evaluated with respect to Bleed-through resistance for plain paper, Character Quality, Ink thixotropy, Ink storage stability and Ejection stability, according to the method below.

[Evaluation of Bleed-Through Resistance for Plain Paper]

According to above method, black solid image was prepared on PPC paper (J PAPER produced by Konica Minolta Business Solutions Japan Co., Ltd.). Optical density of rear side thereof was determined by optical densitometer (Optical densitometer 938 produced by X-Rite). Further, optical density of unrecorded portion on the same paper was also determined. Thereafter, the difference of density was calculated by the following formula:

(Density of the rear side of Black solid image)−(Density of the unprinted image portion), whereby bleed-through resistance was evaluated based on the following criteria.

A: Difference of density was less than 0.05.
B: Difference of density was more than 0.05 and less than 0.08.
C: Difference of density was more than 0.08 and less than 0.12.
D: Difference of density was more than 0.12.

[Evaluation of Character Quality]

According to above method, onto art paper for printing (SA Kinfuji produced by OJI PAPER), characters of 口, 図, 日, 民, 氏, 困, 間, 匡, 日, 国, 宵 by MS Mincho font character in 3, 4, 5 point each were printed with a recording resolution of 1440×1440 dpi, and the resulting characters were evaluated by visual examination based on the following criteria.

A: All of 4 point characters were recorded clearly in detail.
B: Only part of 4 point characters was legible, but all of 5 point characters were legible.
C: Only part of 4 and 5 point characters was legible, but all of 6 point characters were legible.
D: Some of 6 point characters were illegible.

[Evaluation of Variation of Dot Diameter]

According to above method, onto three kind of papers such as art paper for printing (SA Kinfuji produced by OJI PAPER), cast coated printing paper (Minor Coat Gold produced by OJI PAPER), and coated printing paper (OK matt Coat Green 100 produced by OJI PAPER), a image for measurement of dot diameter in which pixels were arranged at 360 dpi intervals were printed. Dot diameters of 20 dots on each paper were determined by using optical microscope (VHX-500 produced by KEYENCE) and average dot diameter was calculated. Thereafter, Index of dot diameter variation was calculated according to below and the resulting Index of dot diameter variation was evaluated based on the following criteria.

Index of dot diameter variation=(Average dot diameter on the paper having maximum average dot diameter)/(Average dot diameter on the paper having minimum average dot diameter)

A: Index of dot diameter variation was more than 1.00 and less than 1.15.
B: Index of dot diameter variation was more than 1.15 and less than 1.30.
C: Index of dot diameter variation was more than 1.30 and less than 1.50.
D: Index of dot diameter variation was more than 1.50.

[Evaluation of Curability by Ultraviolet Ray]

A cellophane tape (Registered trademark) was allowed to adhere to the solid image printed onto the art paper. Thereafter, the state of image after peeling off the cellophane tape vertically was visually observed and evaluated based on the following criteria.

A: No peeling of image and no change of image surface was noted at all.

B: No peeling of image was noted, however at least a part of image became cloudy.

C: Peeling of image was slightly noted at edge of image.

D: Peeling of image was apparently noted.

<<Evaluation of Ink Properties>>

[Evaluation of Ink Thixotropy]

Viscosity of Inks 101-117 were measured by using Viscoelasticity measurement apparatus (USD-300; produced by Paar Physica) at shear rate of 1 sec and 1000 sec. Temperature of the ink was at phase transition temperature +20° C. in case of gelling ink and 80° C. in case of ink without gelling. Thereafter, Index of ink thixotropy was evaluated based on the calculation by the following expression.

Index of ink thixotropy=(Viscosity at shear rate 1 sec)/(Viscosity at shear rate 1000 sec)

A: Index of ink thixotropy was more than 0.98 and less than 1.02.

B: Index of ink thixotropy was more than 0.90 and less than 0.98; or more than 1.02 and less than 1.10.

C: Index of ink thixotropy was more than 0.75 and less than 0.90; or more than 1.10 and less than 1.25.

D: Index of ink thixotropy was less than 0.75 or more than 1.25.

[Evaluation of Ink Storage Stability]

Inks 1-18 each was stored in a glass bottle with airtight stopper at 0° C. and 23° C. for 14 days. After storage, the ink stored at 0° C. was allowed to room temperature, and Ink storage stability was observed by comparing the state of the two inks and evaluated based on the following criteria.

A: No difference was noticed between two inks

B: Slightly separated liquid was noticed at the surface of the ink stored at 0° C.

C: Slightly separated liquid was noticed at the entirely of the ink stored at 0° C.

D: Separated liquid was noticed at the entirely of the ink stored at 0° C.

[Evaluation of Ejection Stability]

Printer employing each of above prepared inks was put in the cycled ambience in which temperature was changed in the range of 10-40° C. in 12 hours per 1 cycle, and repeated 3 cycles. Thereafter, nozzle ejection failure and curved ejection was visually observed and ejection stability was evaluated based on the following criteria.

A: No nozzle ejection failure was observed.

B: At 1-6 nozzles among all of 256 nozzles, ejection direction was shifted.

C: At 1-2 nozzles among all of 256 nozzles, ejection failure was observed.

D: At 3 or more nozzles among all of 256 nozzles, ejection failure was observed.

Results were listed in Table 8.

TABLE 8

| | Evaluation of formed images | | | | Evaluation of Ink properties | | | |
| --- | --- | --- | --- | --- | --- | --- | --- | --- |
| Image No. | Bleed-through resistance for plain paper | Character Quality | Variation of Dot diameter | Curability by Ultraviolet ray | Ink thixotropy | Ink storage stability | Ejection stability | Remarks |
| 101 | D | D | D | A | A | A | A | Comp. |
| 102 | B | B | C | B | D | D | D | Comp. |
| 103 | B | B | C | B | C | C | B | Comp. |
| 104 | B | B | B | C | C | C | C | Comp. |
| 105 | D | D | D | A | A | A | A | Comp. |
| 106 | C | B | C | A | A | A | A | Inv. |
| 107 | A | A | A | A | A | A | A | Inv. |
| 108 | B | A | A | A | A | A | A | Inv. |
| 109 | B | B | B | A | A | A | A | Inv. |
| 110 | A | A | A | A | A | A | A | Inv. |
| 111 | A | A | A | A | A | A | B | Inv. |
| 112 | A | A | A | A | A | A | A | Inv. |
| 113 | A | A | A | B | B | B | C | Inv. |
| 114 | A | A | A | D | C | C | C | Comp. |
| 115 | D | D | D | A | A | A | A | Comp. |
| 116 | B | B | B | A | A | A | A | Inv. |
| 117 | B | B | B | A | A | A | A | Inv. |

Comp.: Comparative example, Inv.: Inventive example

As can clearly seen from Table 8, the actinic energy radiation curable inkjet inks comprising a compound represented by Formula (2) according to the present invention were superior to Comparative Examples in each of character quality and bleed-through resistance of formed image, further little ink thixotropy, resulting in ejection stability, and ink storage stability, still further excellent curability by ultraviolet ray of formed image.

Example 7

By employing a line head printer described in Example 6, Image Nos. 118-124 ere printed onto PPC paper (J PAPER produced by Konica Minolta Business Solutions, Inc.), art paper for printing (SA Kinfuji produced by OJI PAPER), cast coated printing paper (Mirror Coat Gold produced by OJI PAPER), and coated printing paper (OK matt Coat Green 100 produced by OJI PAPER), as the same manner as Example 3, except for employing Inks 102 and 110 of Example 6 and temperature of recording head and ink in the recording head and recording medium being the temperature described in Table 9. Character quality, variation of dot diameter, and ejection stability were evaluated as the same manner as Example 6. Results were listed in Table 9.

TABLE 9

| Image No. | Ink No. | Phase transition Temperature (° C.) | Temperature of Recording head (° C.) | Temperature of Recording medium (° C.) | Evaluation of formed images | | | Remarks |
|---|---|---|---|---|---|---|---|---|
| | | | | | Character Quality | Variation of Dot diameter | Ejection stability | |
| 118 | 102 | 40 | 60 | 25 | B | B | D | Comparative example |
| 119 | 102 | 40 | 45 | 25 | C | B | D | Comparative example |
| 120 | 102 | 40 | 100 | 15 | C | C | D | Comparative example |
| 121 | 110 | 55 | 65 | 45 | B | C | B | Inventive example |
| 122 | 110 | 55 | 60 | 25 | A | B | C | Inventive example |
| 123 | 110 | 55 | 100 | 25 | A | B | A | Inventive example |
| 124 | 110 | 55 | 70 | 25 | A | A | A | Inventive example |

As can clearly seen from Table 9, the actinic energy radiation curable inkjet ink each of the present invention exhibits excellent character quality of formed image, small variation of dot diameter, and further excellent ejection stability, comparing to Comparative Examples. Further, by arranging a heating temperature of recording head and recording medium, better character quality of formed image, small variation of dot diameter, and further good ejection stability can be obtained.

Example 8

<<Preparation of Pigment Dispersion>>
[Preparation of Yellow Pigment Dispersion 11]

| | |
|---|---|
| Pigment: Yellow pigment (Novoperm P-HG, produced by Clariant) | 15 parts |
| Pigment dispersant: PB822 (produced by Ajinomoto Fine-Techno Co., Inc.) | 5 parts |
| Oxetane compound (OXT221, produced by Toagosei Co., Ltd.) | 80 parts |

By mixing the additives above, followed by milling by beads mill, Yellow Pigment dispersion 11 was prepared. Volume average particle diameter of pigment in Yellow Pigment dispersion 11 was measured to be 120 nm by Zetasizer 1000 (produced by Malvern Instruments Ltd.).

[Preparation of Magenta Pigment Dispersion 11]

| | |
|---|---|
| Pigment: Magenta pigment (Hostaperm Pink E, produced by Clariant) | 15 parts |
| Pigment dispersant: PB822 (produced by Ajinomoto Fine-Techno Co., Inc.) | 5 parts |
| Oxetane compound (OXT221, produced by Toagosei Co., Ltd.) | 80 parts |

By mixing the additives above, followed by milling by beads mill, Magenta Pigment dispersion 11 was prepared. Volume average particle diameter of pigment in Magenta Pigment dispersion 11 was measured to be 100 nm by Zetasizer 1000 (produced by Malvern Instruments Ltd.).

[Preparation of Cyan Pigment Dispersion 11]

| | |
|---|---|
| Pigment: Cyan pigment (Hostaperm Blue B2G, produced by Clariant) | 20 parts |
| Pigment dispersant: PB822 (produced by Ajinomoto Fine-Techno Co., Inc.) | 5 parts |
| Oxetane compound (OXT221, produced by Toagosei Co., Ltd.) | 75 parts |

By mixing the additives above, followed by milling by beads mill, Cyan Pigment dispersion 11 was prepared. Volume average particle diameter of pigment in Cyan Pigment dispersion 11 was measured to be 85 nm by Zetasizer 1000 (produced by Malvem Instruments Ltd.).

[Preparation of Black Pigment Dispersion 11]

Black Pigment dispersion 11 described in Example 6 was used.

<<Preparation of Ink Set>>

Ink set was prepared which comprise each ink bellow.

[Preparation of Yellow Ink]

Following additives were added and mixed in order. After heating at 130° C. and mixing, obtained liquid was filtered via metal mesh filter of #3000 while heating, followed by cooling to prepare Yellow Ink.

| | |
|---|---|
| Polymerizable compound: Oxetane 221 (OXT221 produced by Toagosei Co., Ltd.) | 35 parts |
| Polymerizable compound: Celoxide 2021P (C2021P, produced by Dicel Chemical Industries, Ltd.) | 20 parts |
| Photopolymerization initiator: UVI 6992 (produced by Dow Chemical Company) | 5 parts |
| Yellow Pigment dispersion 11 | 30 parts |
| Exemplified compound I | 10 parts |

[Preparation of Magenta Ink]

Following additives were added and mixed in order. After heating at 130° C. and mixing, obtained liquid was filtered via metal mesh filter of #3000 while heating, followed by cooling to prepare Magenta Ink.

| | |
|---|---|
| Polymerizable compound: Oxetane 221 (OXT221 produced by Toagosei Co., Ltd.) | 45 parts |
| Polymerizable compound: Celoxide 2021P (C2021P, produced by Dicel Chemical Industries, Ltd.) | 20 parts |
| Photopolymerization initiator: UVI 6992 (produced by Dow Chemical Company) | 5 parts |
| Magenta Pigment dispersion 11 | 20 parts |
| Exemplified compound I | 10 parts |

[Preparation of Cyan Ink]

Following additives were added and mixed in order. After heating at 130° C. and mixing, obtained liquid was filtered via metal mesh filter of #3000 while heating, followed by cooling to prepare Cyan Ink.

| | |
|---|---|
| Polymerizable compound: Oxetane 221 (OXT221 produced by Toagosei Co., Ltd.) | 55 parts |
| Polymerizable compound: Celoxide 2021P (C2021P, produced by Dicel Chemical Industries, Ltd.) | 20 parts |
| Photopolymerization initiator: UVI 6992 (produced by Dow Chemical Company) | 5 parts |
| Cyan Pigment dispersion 11 | 10 parts |
| Exemplified compound I | 10 parts |

[Preparation of Black Ink]

Following additives were added and mixed in order. After heating at 130° C. and mixing, obtained liquid was filtered via metal mesh filter of #3000 while heating, followed by cooling to prepare Black Ink.

| | |
|---|---|
| Polymerizable compound: Oxetane 221 (OXT221 produced by Toagosei Co., Ltd.) | 45 parts |
| Polymerizable compound: Celoxide 2021P (C2021P, produced by Dicel Chemical Industries, Ltd.) | 20 parts |
| Photopolymerization initiator: UVI 6992 (produced by Dow Chemical Company) | 5 parts |
| Black Pigment dispersion 11 | 20 parts |
| Exemplified compound I | 10 parts |

[Preparation of Light Magenta Ink]

Following additives were added and mixed in order. After heating at 130° C. and mixing, obtained liquid was filtered via metal mesh filter of #3000 while heating, followed by cooling to prepare Light Magenta Ink.

| | |
|---|---|
| Polymerizable compound: Oxetane 221 (OXT221 produced by Toagosei Co., Ltd.) | 55 parts |
| Polymerizable compound: Celoxide 2021P (C2021P, produced by Dicel Chemical Industries, Ltd.) | 25 parts |
| Photopolymerization initiator: UVI 6992 (produced by Dow Chemical Company) | 5 parts |
| Magenta Pigment dispersion 11 | 5 parts |
| Exemplified compound I | 10 parts |

[Preparation of Light Cyan Ink]

Following additives were added and mixed in order. After heating at 130° C. and mixing, obtained liquid was filtered via metal mesh filter of #3000 while heating, followed by cooling to prepare Light Cyan Ink.

| | |
|---|---|
| Polymerizable compound: Oxetane 221 (OXT221 produced by Toagosei Co., Ltd.) | 58 parts |
| Polymerizable compound: Celoxide 2021P (C2021P, produced by Dicel Chemical Industries, Ltd.) | 25 parts |
| Photopolymerization initiator: UVI 6992 (produced by Dow Chemical Company) | 5 parts |
| Cyan Pigment dispersion 11 | 2 parts |
| Exemplified compound I | 10 parts |

<<Measurement of Each Ink Properties>>

Phase transition temperature of each color ink obtained above was measured by the same method described in Example 1. Results were listed in Table 5.

TABLE 10

| | Ink composition (parts by mass) | | | | | Phase transition temperature (° C.) |
|---|---|---|---|---|---|---|
| Ink species | OXT221 | C2021P | UV16992 | Pigment dispersion | Exemplified compound 1 | |
| Yellow ink | 35 | 20 | 5 | 30 | 10 | 55 |
| Magenta Ink | 45 | 20 | 5 | 20 | 10 | 55 |
| Cyan Ink | 55 | 20 | 5 | 10 | 10 | 57 |
| Black Ink | 45 | 20 | 5 | 20 | 10 | 54 |
| Light Magenta Ink | 55 | 25 | 5 | 5 | 10 | 58 |
| Light Cyan Ink | 58 | 25 | 5 | 2 | 10 | 58 |

<<Formation and Evaluation of Inkjet Image>>

By employing a line head printer described in Example 6, loaded with 6 line heads arranged in the paper conveying direction, and employing 6 colored inks, Mincho font character in 3 point and Image of JIS/SCID N5 "bicycle" pattern were printed onto PPC paper (J PAPER produced by Konica Minolta Business Solutions, Inc.), art paper for printing (SA Kinfuji produced by OJI PAPER), cast coated printing paper (Mirror Coat Gold produced by OJI PAPER), and coated printing paper (OK matt Coat Green 100 produced by OJI PAPER), as the same manner as Example 6. Character quality, bleed-through resistance, variation of dot diameter, curability by ultraviolet ray and ejection stability were evaluated as the same manner as Example 6. In all evaluation items, excellent effect can be confirmed.

Further, by visual inspection of obtained Image of JIS/SCID N5 "bicycle" Pattern, it is confirmed that image degradation by coalescence of droplets cannot be observed and images having excellent sharpness, high optical density can be obtained.

DESCRIPTION OF THE ALPHANUMERIC DESIGNATIONS

1 Inkjet recording apparatus
2 Recording head carriage
3 Recording head
31 Ink ejecting orifice
4 Irradiation member
5 Platen
6 Guide member
7 Bellows structure
P Recording medium

What is claimed is:

1. An actinic energy radiation curable inkjet ink comprising a compound represented by Formula (1) or a compound represented by Formula (2) in an amount of not less than 0.1% by mass and less than 20% by mass based on a total mass of the ink, Formula (1):

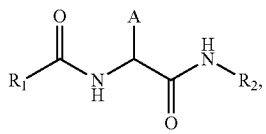

wherein $R_1$ and $R_2$ each represents a linear, a branched or a cyclic alkyl group, or a linear, a branched or a cyclic alkenyl group; A represents a linear or a branched alkyl group having a carbon number of 1 to 4, or a benzyl group, Formula (2):

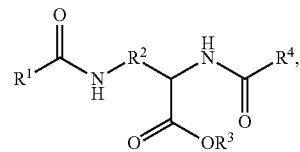

wherein $R^1$ and $R^4$ each represents a linear or a branched alkyl group, or a linear or a branched alkenyl group; $R^2$ represents a linear alkylene group having a carbon number of 1 to 5; $R^3$ represents a linear alkyl group having a carbon number of 1 to 5.

2. The actinic energy radiation curable ink-jet ink of claim 1, wherein A in Formula (1) is at least one group selected from methyl group, isopropyl group, isobutyl group, sec-butyl group and benzyl group.

3. The actinic energy radiation curable inkjet ink of claim 1, wherein an end of $R^1$ and $R^2$ each in Formula (1) is a vinyl group or a methyl group, and other than the ends, each of $R^1$ and $R^2$ comprises a linear saturated alkyl group having carbon numbers of 2 to 30.

4. The actinic energy radiation curable inkjet ink of claim 1, wherein $R^2$ in Formula (2) is a tetramethylene group, and $R^1$ and $R^4$ each is a linear alkyl group having carbon numbers of 2 to 30, and the end thereof is a vinyl group or a hydrogen atom.

5. The actinic energy radiation curable inkjet ink of claim 1, comprising a pigment as a colorant.

6. The actinic energy radiation curable inkjet ink of claim 1, wherein the ink changes a sol-gel phase transition reversibly according to a temperature, and the sol-gel phase transition temperature is not less than 30° C. and less than 100° C.

7. An inkjet recording method for recording an image comprising jetting the actinic energy radiation curable inkjet ink of claim 1 on a recording medium, wherein the image is recorded under a condition of a difference of a temperature between the temperature of the actinic energy radiation curable inkjet ink in the recording head and the temperature of the recording medium being not less than 25° C. and less than 100° C.

8. The inkjet recording method of claim 7, wherein the actinic energy radiation curable inkjet ink is heated in the recording head.

9. The inkjet recording method of claim 7, wherein the image is recorded under heating the recording head in a range from not less than T+10° C. to less than T+40° C., wherein T(° C.) is the sol-gel phase transition temperature.

* * * * *